US012616995B2

(12) United States Patent
Pittet et al.

(10) Patent No.: US 12,616,995 B2
(45) Date of Patent: May 5, 2026

(54) METHODS FOR PRODUCING OVERT SECURITY FEATURES EXHIBITING ONE OR MORE INDICIA

(71) Applicant: SICPA HOLDING SA, Prilly (CH)

(72) Inventors: Hervé Pittet, Châtel-Saint-Denis (CH); Patrick Veya, Aclens (CH); Mélissa Bersier, Cugy (CH)

(73) Assignee: SICPA HOLDING SA, Prilly (CH)

( * ) Notice: Subject to any disclaimer, the term of this patent is extended or adjusted under 35 U.S.C. 154(b) by 125 days.

(21) Appl. No.: 18/711,526

(22) PCT Filed: Nov. 11, 2022

(86) PCT No.: PCT/EP2022/081647
§ 371 (c)(1),
(2) Date: May 17, 2024

(87) PCT Pub. No.: WO2023/088805
PCT Pub. Date: May 25, 2023

(65) Prior Publication Data
US 2025/0121405 A1 Apr. 17, 2025

(30) Foreign Application Priority Data

Nov. 18, 2021 (EP) .................................... 21209104

(51) Int. Cl.
B05D 3/06 (2006.01)
B05D 5/00 (2006.01)
(Continued)

(52) U.S. Cl.
CPC ............... B05D 3/067 (2013.01); B05D 5/00 (2013.01); C09D 11/101 (2013.01); C09D 11/106 (2013.01); B05D 2506/25 (2013.01)

(58) Field of Classification Search
CPC ...... B05D 3/067; B05D 5/00; B05D 2506/25; C09D 11/101; C09D 11/106
See application file for complete search history.

(56) References Cited

FOREIGN PATENT DOCUMENTS

| WO | 2006074969 | 7/2006 |
| WO | 2013127715 | 9/2013 |

(Continued)

OTHER PUBLICATIONS

*Printing Technology*, J. M. Adams and p. A. Dolin, Delmar Thomson Learning, 5$^{th}$ Edition, 2002, pp. 359-360.
(Continued)

*Primary Examiner* — Robert S Walters, Jr.
(74) *Attorney, Agent, or Firm* — MUNCY, GEISSLER, OLDS & LOWE, P.C.

(57) ABSTRACT

Methods for producing eye-catching overt security features exhibiting one or more indicia for anti-counterfeit purposes on value documents or articles as well as decorative purposes are disclosed. In particular, the present invention provides methods for producing security features that can be easily, directly and unambiguously authenticated by the human without any external device or tool, wherein the security features comprised a cured ink and one or more cured indicia, the ink comprising cured cationically curable compounds or cured hybrid curable compounds and silver nanoplatelets.

20 Claims, 2 Drawing Sheets

(51) Int. Cl.
   C09D 11/101     (2014.01)
   C09D 11/106     (2014.01)

(56)             References Cited

FOREIGN PATENT DOCUMENTS

| | | | | |
|---|---|---|---|---|
| WO | 2014067715 | 5/2014 | | |
| WO | 2020083794 | 4/2020 | | |
| WO | 2020224982 | 11/2020 | | |
| WO | 2020234211 | 11/2020 | | |
| WO | 2021175907 | 9/2021 | | |
| WO | 2021213942 | 10/2021 | | |
| WO | 2021214244 | 10/2021 | | |
| WO | WO-2021259527 A1 * | 12/2021 | ............. | B05D 5/065 |
| WO | WO-2022101225 A1 * | 5/2022 | ........... | B42D 25/378 |

OTHER PUBLICATIONS

*Handbook of Print Media*, Helmut Kipphan, Springer Edition, 2001, p. 48.
*The Printing Ink Manual*, R.H. Leach and R.J. Pierce, Springer Edition, 5th Edition, 2008, pp. 58-62.
*Printing Technology*, J. M. Adams and P.A. Dolin, Delmar Thomson Learning, 5th Edition, 2002, pp. 293-328.
*Handbook of Print Media*, H. Kipphan, Springer, 2001, pp. 409-422 and pp. 498-499.
"*Chemistry & Technology of UV & EB Formulation for Coatings, Inks & Paints*", vol. III, "*Photoinitiators for Free Radical Cationic and Anionic Polymerization*", 2nd edition, by J. V. Crivello & K. Dietliker, edited by G. Bradley and published in 1998 by John Wiley & Sons in association with SITA Technology Limited.
*Industrial Photoinitiators*, W. A. Green, CRC Press, 2010, Table 8.1 p .170.
P.V. Raje and N.C. Murmu, *A Review of Electrohyrdodynamic-inkjet Printing Technology*, International Journal of Emerging Technology and Advanced Engineering, (2014), 4(5), pp. 174-183.
F. C. Krebs, *Fabrication and processing of polymer solar cells: A review of printing and coating techniques*, Solar Energy Materials & Solar Cells (2009), 93, p. 405-406.
F. C. Krebs, *Fabrication and processing of polymer solar cells: A review of printing and coating techniques*, Solar Energy Materials & Solar Cells (2009), 93, p. 407.
N. J. Wilkinson et al., *A review of aerosol jet printing-a non-traditional hybrid process for micro-manufacturing*, The International Journal of Advanced Manufacturing Technology (2019) 105:4599-4619.
International Search Report and Written Opinion issued with respect to application No. PCT/EP2022/081647.

* cited by examiner

130

110

120

230

210

220

| point | dpd value | average weight (x10+x20) [g] | average weight (x10+x20+x30) [g] | measured ink deposit [g/m²] | calculated ink deposit [g/m²] |
|-------|-----------|------------------------------|-----------------------------------|------------------------------|--------------------------------|
| 1 | 1 | 0.6101 | 0.6132 | 3.4 | 3.8 |
| 2 | 3 | 0.6012 | 0.6113 | 11.2 | 11.5 |
| 3 | 5 | 0.6211 | 0.6388 | 19.7 | 19.2 |
| 4 | 7 | 0.6184 | 0.6425 | 26.8 | 26.9 |

METHODS FOR PRODUCING OVERT SECURITY FEATURES EXHIBITING ONE OR MORE INDICIA

FIELD OF THE INVENTION

The present invention relates to the field of methods for producing security features on substrates, in particular on value documents or articles. In particular, the present invention provides methods for producing eye-catching overt security features exhibiting a first color upon viewing in transmitted light and a second color different from the first color upon viewing in incident light and exhibiting one or more indicia as anti-counterfeit means on value documents or articles as well as decorative purposes.

BACKGROUND OF THE INVENTION

With the constantly improving quality of color photocopies and printings and in an attempt to protect value documents such as banknotes, value documents or cards, transportation tickets or cards, tax banderols, and product labels that have no reproducible effects against counterfeiting, falsifying or illegal reproduction, it has been the conventional practice to incorporate various security means features in these documents.

Security features, e.g. for value documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

A special role in securing value documents is played by dichroic security features exhibiting a first color upon viewing in transmitted light and a second color different from the first color upon viewing in incident light. To provide a striking effect and draw the layperson's attention, the first color and the second color must have an attractive visual appearance, such as blue, metallic yellow, magenta, and green, and a significant color contrast (for e.g.: blue/metallic yellow, green/metallic yellow, violet/metallic yellow).

Dichroic security features showing a blue color upon viewing in transmitted light and a metallic yellow color upon viewing in incident light may be obtained from silver platelets containing inks.

WO 2020/224982 A1 discloses compositions comprising silver nanoplatelets as well as coatings comprising said nanoplatelets and exhibiting a blue color in transmission and a metallic yellow color in reflection.

WO 2020/083794 A1 discloses compositions comprising silver nanoplatelets as well as coatings comprising said nanoplatelets and exhibiting a red or magenta color in transmission and a greenish-metallic color in reflection.

WO 2021/213942 A1 discloses compositions comprising platelet-shaped transition metal particles as well as coatings comprising said particles and exhibiting a turquoise or blue color in transmission and a yellowish metallic color in reflection or exhibiting a red or magenta color in transmission and a greenish metallic color in reflection.

WO 2021/214244 A1 discloses processes for manufacturing a security feature for securing a value document, wherein said security feature exhibits a blue color upon viewing in transmitted light and a metallic yellow color upon viewing in incident light. The disclosed processes comprises the steps of a) printing a specific UV-Vis radiation curable ink on a transparent or partially transparent region of a substrate of a value document; b) heating the ink layer obtained at step a) at a temperature of about 55° C. to about 100° C. for at least one second so that the ink layer exhibits a metallic yellow color upon viewing in incident light; and c) UV-Vis curing the ink layer obtained at step b) to form the security feature.

The co-pending European Patent Application EP20206794.8 discloses UV-Vis radiation curable security inks for producing a security feature exhibiting a blue color upon viewing in transmitted light and a metallic yellow color upon viewing in incident light, wherein said ink comprises silver nanoplatelets, UV-Vis radiation curable compounds, one or more cationic photoinitiators, a perfluoropolyether surfactant and a polyvinyl chloride copolymer.

WO 2021/175907 A1 discloses UV-Vis radiation cationically curable security inks and UV-Vis radiation curable hybrid security inks comprising an ink vehicle and pigments comprising a flake-shaped non-metallic or metallic substrate comprising one or more at least partial coating layers, an at least partial surface treatment layer made of one or more surface modifiers based on perfluoropolyethers.

Therefore, a need remains for methods for producing eye-catching customized overt security features comprising silver nanoplatelets and exhibiting a blue color upon viewing in transmitted light and a metallic yellow color upon viewing in incident light, in particular for highly demanding applications requiring high counterfeiting resilience and excellent optical properties, wherein said methods should be reliable, easy to implement and able to work at a high production speed. In particular, there is a need for methods using solvent-free or low VOC containing UV-Vis radiation curable inks being cationically curable inks or hybrid curable inks for producing customized overt security features based on silver nanoplatelets and exhibiting one or more well resolved indicia, wherein said security features exhibit easily recognizable optical characteristics, in particular exhibit a contrast of chroma, thus allowing an easy, direct and unambiguous authentication by the human without any external device or tool.

SUMMARY OF THE INVENTION

Accordingly, it is an object of the present invention to overcome the deficiencies of the prior art. This is achieved by the provision of a method for producing a security feature on a substrate (x20), said security feature exhibiting one or more indicia (x30), the method comprising the steps of:

a step a) of applying on a substrate (x20) surface a UV-Vis radiation curable ink, said UV-Vis radiation curable ink being in a first, liquid state so as to form a coating layer (x10), said UV-Vis radiation curable ink comprising:

i) from about 7.5 wt-% to about 20 wt-% of silver nanoplatelets bearing a surface stabilizing agent of general formula (V)

3 a)

$$R^A \diagdown S^- \atop R^B \diagup N {=\!\!\!=} \atop S \quad \text{Cat}^+,$$ (V)

wherein the residue $R^A$ is a $C_2$-$C_4$alkyl group substituted with a hydroxy group;

the residue $R^B$ is selected from a $C_1$-$C_4$alkyl group, and a $C_2$-$C_4$alkyl group substituted with a hydroxy group; and $Cat^+$ is an ammonium cation of general formula $^+NH_2R^CR^D$, wherein the residue $R^C$ is a $C_2$-$C_4$alkyl group substituted with a hydroxy group; and the residue $R^D$ is selected from a $C_1$-$C_4$alkyl group, and a $C_2$-$C_4$alkyl group substituted with a hydroxy group;

ii) from about 45 wt-% to about 80 wt-% of either a cycloaliphatic epoxide, or a mixture of a cycloaliphatic epoxide and one or more UV-Vis radiation curable compounds;

iii) one or more cationic photoinitiators;

iv) a perfluoropolyether surfactant functionalized with one or more functional groups selected from the group consisting of hydroxyl, acrylate, methacrylate, and trialkoxysilyl;

v) from about 3 wt-% to about 12 wt-% of a polyvinyl chloride copolymer containing at least 60 wt-% of vinyl chloride; and optionally vi) up to about 25 wt-% of one or more organic solvents;

the weight percents being based on the total weight of the UV-Vis radiation curable ink, subsequently to the step a), a step b) of applying by a contactless fluid microdispensing technology a top coating composition at least partially on top of the coating layer (x10), wherein said top coating composition is applied in the form of one or more indicia (x30), wherein said one or more indicia (x30) have an ink deposit greater than about 0.8 g/m², preferably greater than or equal to 1.0 g/m²;

subsequently to step b), a step c) of curing the coating layer (x10) and the one or more indicia (x30) with one or more curing units (x50), wherein the time between steps b) and c) is less than 5 seconds, preferably less than about 4 seconds and more preferably equal to about 3.5 seconds or less than about 3.5 seconds.

In one preferred embodiment, the step a) of applying the UV-Vis radiation curable ink described herein is carried out by a printing process selected from the group consisting of rotogravure processes, flexography processes and screen printing processes, preferably selected from the group consisting of screen printing processes.

In one preferred embodiment, the step b) of applying the top coating composition is carried out by an inkjet printing process, preferably by a drop-on-demand inkjet printing process.

Also described herein are security features produced by the method described herein and value documents and value articles as well as decorative elements and objects comprising the one or more security features described herein.

Also described herein are methods of manufacturing a value document, value article or a decorative element or object, comprising a) providing a value document, value article or a decorative element or object and b) providing one or more security features such as those described herein, in particular such as those obtained by the methods described herein, so that it is comprised on or by the value document, value article or by the decorative element or object.

The method described herein advantageously uses two compositions, wherein said two compositions are applied on each other in a wet-on-wet state, i.e. the top coating composition described herein is applied at least partially on the applied UV-Vis radiation curable ink described herein while said composition is still in an at least partially unpolymerized state. In particular, the method according to the invention allows the production of eye-catching overt security features exhibiting one or more indicia in a versatile manner, can be easily implemented on an industrial scale at a high production speed. The two compositions used in the method described herein comprise as a first composition, the UV-Vis radiation curable ink comprising the silver nanoplatelets described herein which is applied on the substrate (x20) described herein and the top coating composition described herein as second composition which is applied at least partially on top of the UV-Vis radiation curable ink and at least partially overlaps (i.e. overlaps in at least one area) said composition and which is applied in the form of the one or more indicia described herein, when said UV-Vis radiation curable ink is still in a wet, at least partially unpolymerized state. Upon curing of the UV-Vis radiation curable ink and the top coating composition in the shape of the one or more indicia (x30), the so-obtained overt security features comprise a first area made of the cured coated layer (x10) lacking the cured one or more inkjet printed indicia (x30) and a second well resolved area made of the combination of the cured coated layer (x10) and the one or more cured inkjet printed indicia (x30), said first and second areas exhibiting different optical characteristics in terms of chroma thus allowing an easy, direct and unambiguous authentication by the human without any external device or tool of the overt security feature.

DETAILED DESCRIPTION

Definitions

Figures 1A, 1B, 2:
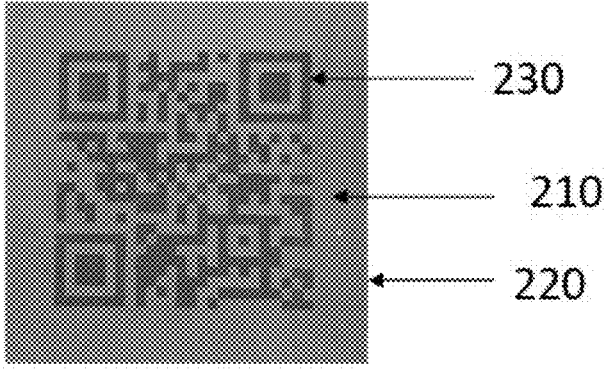
FIG. 1A shows a picture of a substrate (120) comprising a security feature, wherein said feature comprises a cured inkjet printed indicium (130) in the shape of the name "SICPA" of decreasing font sizes, said security feature being prepared with the method according to the present invention. The security feature comprises a first area made of a cured coated layer (110) lacking the cured inkjet printed indicium (130) and a second area made of the combination of the cured coated layer (110) and the cured inkjet printed indicium (130) and being observed under diffuse illumination at an angle of about 0°.
FIG. 1B shows for comparison purpose a picture of a substrate (120) comprising a first area made of a cured coated layer (110) overprinted with the same indicium (130) as described for FIG. 1A, wherein said indicium is printed with a laser printer at a resolution of 600 dpi instead of inkjet printing.
FIG. 2 shows a picture of a substrate (220) comprising a security feature, wherein said feature comprises a cured inkjet printed indicium (230) in the shape of a QR code, said security feature being prepared with the method according to the present invention. The security feature comprises a first area made of a cured coated layer (210) lacking the cured inkjet printed indicium (230) and a second area made of the combination of the cured coated layer (210) and the cured inkjet printed indicium (230) and being observed under diffuse illumination at an angle of about 0°.

The following definitions are to be used to interpret the meaning of the terms discussed in the description and recited in the claims.

As used herein, the article "a" indicates one as well as more than one and does not necessarily limit its referent noun to the singular.

As used herein, the term "at least one" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 nm and 600 nm and more preferably between 200 nm and 400 nm).

The term "(meth)acrylate" in the context of the present invention refers to the acrylate as well as the corresponding methacrylate. Likewise, "di(meth)acrylate" refers to diacrylate as well as the corresponding dimethacrylate and tri(meth)acrylate" refers to triacrylate as well as the corresponding trimethacrylate The terms "value document" and "value article" refer to a document/article which is usually protected against counterfeit or fraud by at least one security feature.

The term "security feature" is used to denote an image, pattern or graphic element that can be used for authentication purposes.

Where the present description refers to "preferred" embodiments/features, combinations of these "preferred" embodiments/features are also deemed to be disclosed as long as the specific combination of "preferred" embodiments/features is technically meaningful.

The method described herein allows the production of security features exhibiting one or more indicia (x30) and being made with the UV-Vis radiation curable ink described herein and with the top coating composition described herein by the method described herein. As mentioned hereinabove, the security features made by the method described herein comprise the first area made of the cured coated layer (x10) lacking the one or more cured inkjet printed indicia (x30) and the second area made of the combination of the cured coated layer (x10) and the one or more cured inkjet printed indicia (x30), wherein a sufficient to excellent contrast between said areas are obtained and wherein the first area exhibits a blue color upon viewing in transmitted light i.e. in transmission and exhibits a metallic yellow color or gold color upon viewing in incident light i.e. in reflection, while the one or more indicia (x30) exhibit a brown color.

For the purposes of the present invention, viewing in transmitted light means that the security feature is illuminated from one side, for example by holding said security feature against the daylight or in front of a light source, and viewed from the opposite side. Independently of the side from which the security feature is viewed in transmitted light, a blue color is observed. For the purposes of this invention, an area exhibiting a blue color refers to an area exhibiting a blue color characterized by a chroma value C* (corresponding to a measure of the color intensity or color saturation) higher than 20. An intense to very intense blue color is characterized by a chroma value C* higher than 30. The chroma value C* is calculated from a* and b* values according to the CIELAB (1976) color space, wherein $$C^* = \sqrt{(a^*)^2 + (b^*)^2}.$$

Said a* and b* values in transmitted light are measured using a Datacolor 650 spectrophotometer (parameters: integration sphere, diffuse illumination (pulse xenon D65) and 8° viewing, analyzer SP2000 with dual 256 diode array for wavelength range of 360-700 nm, transmission sampling aperture size of 22 mm).

In the present patent application, the terms "metallic yellow color" and "gold color" are used interchangeably. For the purpose of the present invention, "viewing in incident light" means that the security feature is illuminated from the side comprising the coating layer (x10) and the one or more indicia (x30) described herein and viewed from the same side. For the purpose of the present invention, an area exhibiting a metallic yellow color or gold color refers to an area exhibiting a yellow color characterized by a chroma value C* (corresponding to a measure of the color intensity or color saturation) higher than 20 as calculated from a* and b* values according to the CIELAB (1976) color space, wherein $$C^* = \sqrt{(a^*)^2 + (b^*)^2}$$

and wherein said a* and b* values were measured at 0° to the normal with an illumination angle of 22.5° using a goniometer (Goniospektrometer Codec WI-10 5&5 by Phyma GmbH Austria).

The method described herein comprises the step a) of applying on the substrate (x20) surface described herein the UV-Vis radiation curable ink comprising the silver nanoplatelets described herein so as to form the coating layer (x10) described herein, said composition being in a first liquid state which allows its application as a layer and which is in a not yet cured (i.e. wet) state. Since the UV-Vis radiation curable ink described herein is to be provided on the substrate (x20) surface, the UV-Vis radiation curable ink comprises one or more curable compounds and the silver nanoplatelets described herein, wherein said composition is in a form that allows its processing on the desired printing or coating equipment. Preferably, said step a) is carried out by a printing process, more preferably selected from the group consisting of screen printing processes, rotogravure printing processes and flexography printing processes and still more preferably screen printing processes. Accordingly, the UV-Vis radiation curable ink is preferably selected from the group consisting of screen printing inks, rotogravure printing inks and flexography printing inks and more preferably screen printing inks since said inks are particularly useful for the industrial manufacturing of security features on value documents because it enables printing at very high-speed of security features having a thicknesses between about 2 μm and about 12 μm, preferably between about 3 μm and about 11 and more preferably between about 3.5 μm and about 10 μm.

Preferably, the UV-Vis radiation curable ink is characterized by a viscosity of between about 100 mPas and about 500 mPas at 25° C., preferably between about 150 mPas and about 350 mPas at 25° C., as measured using a Brookfield viscometer (model "DV-I Prime) equipped with a spindle S21 at 100 rpm for measuring viscosities equal to or lower than 500 mPas. UV-Vis radiation curable coating screen printing composition described herein is characterized by a viscosity of between about 100 mPas and about 500 mPas at 25° C., preferably of between about 150 mPas and about 350 mPas at 25° C.

As known by those skilled in the art, the term rotogravure refers to a printing process which is described for example in *Handbook of Print Media*, Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing methods preferably use a unit with a chambered doctor blade, an anilox roller and plate cylinder. The anilox roller advantageously has small cells whose volume and/or density determines the ink or varnish application rate. The chambered doctor blade lies against the anilox roller, filling the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, 5th Edition, pages 359-360.

Screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can easily reach 150 m/min in web or 10'000 sheets/hour in a sheet-fed process.

Screen printing is further described for example in *The Printing ink Manual*, R. H. Leach and R. J. Pierce, Springer Edition, 5<sup>th</sup> Edition, pages 58-62, in *Printing Technology*, J. M. Adams and P. A. Dolin, Delmar Thomson Learning, 5<sup>th</sup> Edition, pages 293-328 and in *Handbook of Print Media*, H. Kipphan, Springer, pages 409-422 and pages 498-499.

According to one embodiment, the UV-Vis radiation curable ink described herein is a UV-Vis radiation cationically curable ink. According to another embodiment, the UV-Vis radiation curable ink described herein is a UV-Vis radiation hybrid curable ink, i.e. an ink comprising one or more cationically curable compounds and one or more free radical curable compounds.

The method described herein comprises the step c) of curing the coating layer (x1) and the one or more indicia (x30); in other words, the UV-Vis radiation curable inks and top coating compositions described herein are subjected to UV-Vis curing to form the security feature described herein. As used herein, the term "UV-Vis curing" refers to radiation-curing of the ink layer by photo-polymerization, under the influence of an irradiation having wavelength components in the UV or in the UV and visible part of the electromagnetic spectrum (typically 100 nm to 800 nm, preferably between 150 nm and 600 nm and more preferably between 200 nm and 400 nm). Cationically curable monomers are cured by cationic mechanisms consisting of the activation by UV-Vis light of one or more photoinitiators, which liberate cationic species, such as acids, which in turn initiate the polymerization of the compound so as to form a cured layer. Radically curable monomers and oligomers are cured by free radical mechanisms consisting of the activation by UV-Vis light of one or more photoinitiators, which liberate free radicals which in turn initiate the polymerization process. Optionally, one or more photosensitizers may also be present. Photosensitizers are activated by one or more of the wavelengths emitted by a UV-Vis light source and reach an excited state. The excited photosensitizer either transfer energy to the one or more photoinitiators (in free-radical polymerization) or an electron (in cationic polymerization). Either process in turn initiates the polymerization process.

Suitable UV-Vis radiation cationically or hybrid curable inks are described in the co-pending European Patent Application EP20206794.8.

The UV-Vis radiation curable inks described herein comprise from about 45 wt-% to about 80 wt-% of either a cycloaliphatic epoxide, or a mixture of a cycloaliphatic epoxide and one or more UV-Vis radiation curable compounds. The one or more UV-Vis radiation curable compounds may comprise one or more cationically curable monomers (cationically curable inks) or comprises one or more cationically curable and one or more radically curable monomers and/or oligomers (hybrid inks). Should the UV-Vis radiation cationically curable inks described herein comprise from about 45 wt-% to about 80 wt-% of a mixture of a cycloaliphatic epoxide and one or more cationically curable monomers, it is preferred that the ratio between the total weight percent (wt-%) of the one or more cationically curable monomers and the weight percent (wt-%) of the cycloaliphatic epoxide is lower than 1.4:1, preferably lower than 1:1, more preferably lower than 0.9:1.

Should the one or more UV-Vis radiation curable compounds comprise one or more radically curable compounds (i.e. consist of hybrid ink), then the UV-Vis radiation curable inks described herein further comprises one or more free radical photoinitiators.

An alternative preferred embodiment is directed to a UV-Vis radiation hybrid curable ink (i.e. an ink comprising both cationically curable monomers and radically curable monomers/oligomers) for producing the security feature described herein, said ink comprising from about 45 wt-% to about 80 wt-% of a mixture of a cycloaliphatic epoxide and one or more radically curable monomers and/or oligomers; or from about 45 wt-% to about 80 wt-%, preferably from about 45 wt-% to about 65 wt-%, of a mixture of a cycloaliphatic epoxide, one or more cationically curable monomers and one or more radically curable monomers and/or oligomers. Should the hybrid ink described herein comprises from about 45 wt-% to about 80 wt-% of a mixture of a cycloaliphatic epoxide and one or more radically curable monomers and/or oligomers, the ratio between the total weight percent (wt-%) of the one or more radically curable monomers and/or oligomers and the weight percent (wt-%) of the cycloaliphatic epoxide is preferably lower than 1.6:1, more preferably lower than 1:1, and even more preferably lower than 0.5:1. Should the hybrid ink described herein comprises from about 45 wt-% to about 80 wt-% of a mixture of a cycloaliphatic epoxide, one or more cationically curable monomers and one or more radically curable monomers and/or oligomers, the ratio between the total weight percent (wt-%) of the one or more radically curable monomers and/or oligomers and the sum of the weight percent (wt-%) of the cycloaliphatic epoxide and of the total weight percent (wt-%) of the one or more cationically curable monomers is preferably lower than 1.6:1, more preferably lower than 1:1, and even more preferably lower than 0.5:1, and the ratio between the weight percent (wt-%) of the one or more cationically curable monomers and the weight percent (wt-%) of the cycloaliphatic epoxide is preferably lower than 1.4:1, more preferably lower than 1:1 and even more preferably lower than 0.9:1.

As known to the skilled person, a cycloaliphatic epoxide is a cationically curable monomer containing at least a substituted or unsubstituted epoxycyclohexyl residue:

The one or more cycloaliphatic epoxides described herein may be difunctional or polyfunctional. Preferably, the one or more cycloaliphatic epoxide described herein comprise at least one cyclohexane ring, and at least two epoxide groups. More preferably, the cycloaliphatic epoxide is a compound of general formula (I):

(I)

wherein -L- represents a single bond or a divalent group comprising one or more atoms. The cycloaliphatic epoxide of general formula (I) is optionally substituted by one or more linear or branched alkyl radicals containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

In the general formula (I), the divalent group -L- may be a straight- or branched-chain alkylene group comprising from one to eighteen carbon atoms. Examples of said straight- or branched-chain alkylene group include without limitation methylene group, methylmethylene group, dimethylmethylene group, ethylene group, propylene group, and trimethylene group.

In the general formula (I), the divalent group -L- may be a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

In the general formula (I), -L- may be a divalent group comprising one or more oxygen-containing linkage groups, wherein said oxygen-containing linkage groups are selected from the group consisting of —C(=O)—, —OC(=O)O—, —C(=O)O—, and —O—. Preferably, the cycloaliphatic epoxide is a cycloaliphatic epoxide of general formula (II), wherein -L- is a divalent group comprising one or more oxygen-containing linkage groups, wherein said oxygen-containing linkage groups are selected from the group consisting of —C(=O)—, —OC(=O)O—, —C(=O)O—, and —O—, and more preferably a cycloaliphatic epoxide of general formula (II-a), (II-b), or (II-c), as defined below:

(II-a)

wherein
$L^1$ can be the same, or different in each occurrence and is a linear or branched alkyl radical containing from one to ten carbon atoms (such as methyl, ethyl, n-propyl, i-propyl, n-butyl, F-butyl, s-butyl, t-butyl, hexyl, octyl, and decyl), and preferably containing from one to three carbon atoms (such as methyl, ethyl, n-propyl, and i-propyl);
$L^2$ can be the same, or different in each occurrence and is a linear or branched alkyl radical containing from one to ten carbon atoms (such as methyl, ethyl, n-propyl, i-propyl, n-butyl, F-butyl, s-butyl, t-butyl, hexyl, octyl, and decyl), and preferably containing from one to three carbon atoms (such as methyl, ethyl, n-propyl, and i-propyl); and
$I1$ and $I2$ are independently of each other integers comprised between 0 and 9, preferably comprised between 0 and 3;

(II-b)

wherein
$L^1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L^2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and
$I1$ and $I2$ are independently of each other integers comprised between 0 and 9, preferably comprised between 0 and 3;
-$L^3$- is a single bond or a linear or branched divalent hydrocarbon group containing from one to ten carbon atoms, and preferably containing from three to eight carbon atoms, such as alkylene groups including trimethylene, tetramethylene, hexamethylene, and 2-ethylhexylene, and cycloalkylene groups such as 1,2-cyclohexylene group, 1,3-cyclohexylene group, and 1,4-cyclohexylene group, and cyclohexylidene group;

(II-c)

wherein
$L^1$ can be the same, or different in each occurrence and is a linear or branched alkyl radical containing from one to three carbon atoms, such as methyl, ethyl, n-propyl, and i-propyl; $L^2$ can be the same, or different in each occurrence and is a linear or branched alkyl radical containing from one to three carbon atoms, such as methyl, ethyl, n-propyl, and i-propyl; and
$I1$ and $I2$ are independently of each other integers comprised between 0 and 9, preferably comprised between 0 and 3.

Preferred cycloaliphatic epoxides of general formula (II-a) include, but are not limited to: 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-mnethyl-cyclohexylmethyl-3,4-epoxy-2-methyl-cyclohexanecarboxylate, and 3,4-epoxy-4-methyl-cyclohexylmethyl-3,4-epoxy-4-methylcyclohexanecarboxylate.

Preferred cycloaliphatic epoxides of general formula (II-b) include, but are not limited to: bis(3,4-epoxycyclohexylmethyl)adipate, bis(3,4-epoxy-6-methylcyclohexylmethyl) adipate, bis(3,4-epoxycyclohexylmethyl)oxalate, bis(3,4-epoxycyclohexylmethyl)pimelate, and bis(3,4-epoxycyclohexylmethyl)sebacate.

A preferred cycloaliphatic epoxide of general formula (II-c) is 2-(3,4-epoxycyclohexyl-5,5-spiro-3,4-epoxy)cyclohexane-meta-d ioxane.

Further cycloaliphatic epoxides include a cycloaliphatic epoxide of general formula (III-a) and a cycloaliphatic epoxide of general formula (III-b), which are optionally substituted by one or more linear or branched alkyl groups containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

(III-a)

(III-b)

The cycloaliphatic epoxides described herein may be hydroxy modified or (meth)acrylate modified. Examples are commercially available under the name Cyclomer A400 (CAS: 64630-63-3) and Cyclomer M100 (CAS number: 82428-30-6) by Daicel Corp., or TTA 15 and TTA16 46 by TetraChem/Jiangsu.

The one or more UV-Vis radiation curable compounds being cationically curable monomers described herein are preferably selected from the group consisting of vinyl ethers, propenyl ethers, cyclic ethers other than a cycloaliphatic epoxide, lactones, cyclic thioethers, vinyl thioethers, propenyl thioethers, hydroxyl-containing compounds, and mixtures thereof, preferably from the group consisting of vinyl ethers, cyclic ethers other than a cycloaliphatic epoxide, and mixtures thereof. Cyclic ethers other than a cycloaliphatic epoxide include epoxides other than a cycloaliphatic epoxide, oxetanes and tetrahydrofuranes. Preferably, the ratio between the total weight percent (wt-%) of the one or more cationically curable monomers and the weight percent (wt-%) of the cycloaliphatic epoxide is lower than 1.4:1, more preferably lower than 1:1, most preferably lower than 0.9:1, and especially preferably lower than 0.8:1.

Vinyl ethers are known in the art to accelerate curing and reduce tackiness, thus limiting the risk of blocking and set-off when the printed sheets are put in stacks just after printing and curing. They also improve the physical and chemical resistance of the printed security features and enhance the flexibility of the printed and cured ink layer and its adhesion to the substrate, which is particularly advantageous for printing on plastic and polymer substrates. Vinyl ethers also help reducing the viscosity of the ink while strongly co-polymerizing with said ink. Examples of preferred vinyl ethers to be used in the security ink described herein include methyl vinyl ether, ethyl vinyl ether, n-propyl vinyl ether, n-butyl vinyl ether, iso-butyl vinyl ether, ethyl-hexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1, 4-butanediol divinyl ether, 1,6-hexanediol divinyl ether, 4-(vinyloxy)butyl benzoate, bis[4-(vinyl oxy)butyl] adipate, bis[4-(vinyloxy)butyl]succinate, bis[4-(vinyloxymethyl)cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinylether, tetraethylene glycol divinyl ether, poly(tetrahydrofuran) divinyl ether, polyethyleneglycol-520 methyl vinyl ether, pluriol-E200 divinyl ether, tris[4-(vinyloxy)butyl]trimellitate, 1,4-bis(2-vinyloxyethoxy)benzene, 2,2-bis(4-vinyloxyethoxyphenyl)propane, bis[4-(vinyloxy)methyl]cyclohexyl] methyl] terephthalate, bis[4-(vinyloxy)methyl]cyclohexyl]methyl] isophthalate. Suitable vinyl ethers are commercially sold by BASF under the designation EVE, BVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA, 2-(2-vinyloxyethoxy)ethyl acrylate from Nippon Shokubai (CAS: 86273-46-3)).

Oxetanes are known in the art to accelerate curing and reduce tackiness, thus limiting the risk of blocking and set-off when the printed sheets are put in stacks just after printing and curing. They also help reducing the viscosity of the ink while strongly co-polymerizing with said ink, Preferred examples of oxetanes include trimethylene oxide, 3,3-dimethyloxetane, trimethylolpropane oxetane, 3-ethyl-3-hydroxymethyl oxetane, 3-ethyl-3-[(2-ethylhexyloxy) methyl]oxetane, 3,3-dicyclomethyl oxetane, 3-ethyl-3-phenoxymethyl oxetane, bis ([1-ethyl(3-oxetanyl)]methyl) ether, 1,4-bis [3-ethyl-3-oxetanyl methoxy)methyl]benzene, 3,3-dimethyl-2(4-methoxy-phenyl)-oxetane, 3-ethyl-[(triethoxysilyl propoxy)methyl]oxetane, 4,4-bis(3-ethyl-3-oxetanyl)methoxymethyl]biphenyl and 3,3-dimethyl-2(p-methoxy-phenyl) oxetane. The one or more oxetanes described herein may be hydroxy modified or (meth)acrylate modified (for example: UVi-Cure S170 from Arkema (previously Lambson) (CAS: 37674-57-0)).

A well-chosen balance of the one or more vinyl ethers described herein and the one or more oxetanes described herein, within the specified range, help optimizing the desired properties of the security features made of the UV-Vis radiation curable ink described herein, in particular easy processability (optimal viscosity, fast curing, no set-off, no blocking) and strong chemical and physical resistance. Furthermore, since vinyl ethers and oxetanes are usually cheaper than cycloaliphatic epoxide compounds, they also help enhancing cost effectiveness.

The use of epoxides in the UV-Vis radiation curable inks described herein aids in accelerating curing and reducing tackiness, as well as in reducing the viscosity of the ink while strongly co-polymerizing with said ink. Preferred examples of an epoxide other than a cycloaliphatic epoxide as described herein include, but are not limited to, cyclohexane dimethanol diglycidylether, poly(ethyleneglycol) diglycidyl ether, poly(propyleneglycol) diglycidyl ether, butanediol diglycidyl ether, hexanediol diglycidyl ether, bisphenol-A diglycidyl ether, neopentylglycol diglycidylether, trimethylolpropane triglycidyl ether, glycerol triglycidyl ether, pentaerythritol tetraglycidyl ether, butyl glycidyl ether, p-tert-butyl phenyl glycidyl ether, hexadecyl glycidyl ether, 2-ethyl-hexyl glycidyl ether, octyl glycidyl ether, decyl glycidyl ether, dodecyl glycidyl ether, tetradecyl glycidyl ether, $C_{12}/C_{14}$-alkyl glycidyl ether, $C_{13}/C_{15}$-alkyl glycidyl ether and mixtures thereof. Suitable epoxides other than a cycloaliphatic epoxide are commercially sold by EMS Griltech under the trademark Grilonit® (e.g. Grilonit® V51-63 or RV 1806).

The radically curable monomers described herein are preferably selected from the group consisting of mono (meth)acrylates, di(meth)acrylates, tri(meth)acrylates, tetra (meth)acrylates, and mixtures thereof, preferably from the group consisting of tri(meth)acrylates, tetra(meth)acrylates, and mixtures thereof. The term "(meth)acrylate" in the context of the present invention refers to the acrylate as well as the corresponding methacrylate.

Preferred examples of mono(meth)acrylates include 2(2-ethoxyethoxy)ethyl (meth)acrylate, 2-phenoxyethyl (meth) acrylate, $C_{12}/C_{14}$ alkyl (meth)acrylate, $C_{16}/C_{16}$ alkyl (meth) acrylate, caprolactone (meth)acrylate, cyclic trimethylolpropane formal (meth)acrylate, nonylphenol (meth)acrylate, isobornyl (meth)acrylate, isodecyl (meth) acrylate, lauryl (meth)acrylate, stearyl (meth)acrylate, octyldecyl (meth)acrylate, tridecyl (meth)acrylate, methoxy poly (ethylene glycol) (meth)acrylate, polypropylene glycol (meth)acrylate, tetrahydrofurfuryl (meth)acrylate, 1,3-butylene glycol di(meth)acrylate, 1,4-butanediol di(meth)acrylate, 1,6-hexanediol di(meth)acrylate, 3-methyl-1,5-pentanedioldi(meth)acrylate, alkoxylated di(meth)acrylate, esterdiol di(meth)acrylate as well as mixtures thereof.

Preferred examples of di(meth)acrylates include bisphenol A di(meth)acrylates, alkoxylated (such as for example ethoxylated and propoxylated) bisphenol A di(meth)acrylate, bisphenol A diglycidyl ether di(meth)acrylate, ethylene glycol di(meth)acrylate, diethylene glycol di(meth)acrylate, triethylene glycol di(meth)acrylate, tetraethylene glycol di(meth)acrylate, dipropyleneglycol di(meth)acrylate, tripropylene glycol di(meth)acrylate, polyethylene glycol di(meth)acrylate, neopentyl glycol di(meth)acrylate, tricyclodecane dimethanol di(meth)acrylate, as well as mixtures thereof.

Preferred examples of tri(meth)acrylates include trimethylolpropane tri(meth)acrylates, alkoxylated (such as for example ethoxylated and propoxylated) trimethylolpropane tri(meth)acrylates, alkoxylated (such as for example ethoxylated and propoxylated) glycerol tri(meth)acrylates, pentaerythritol tri(meth)acrylates, alkoxylated pentaerythritol tri(meth)acrylates, alkoxylated (such as for example ethoxylated and propoxylated) pentaerythritol tri(meth)acrylates, as well as mixtures thereof.

Preferred examples of tetra(meth)acrylates include ditrimethylolpropane tetra(meth)acrylates, pentaerythritol tetra (meth)acrylates, alkoxylated (such as for example ethoxylated and propoxylated) pentaerythritol tetra(meth)acrylates and mixtures thereof, preferably selected from the group consisting of ditrimethylolpropane tetra(meth)acrylates, alkoxylated pentaerythritol tetra(meth)acrylates, as well as mixtures thereof.

As used herein, the term "radically curable oligomer" refers to a radically curable (meth)acrylate oligomer that may be branched or essentially linear, and may have terminal and/or pendant (meth)acrylate functional group(s). Preferably, the radically curable oligomer is selected from the group consisting of (meth)acrylic oligomers, urethane (meth)acrylate oligomers, polyester (meth)acrylate oligomers, polyether based (meth)acrylate oligomers, epoxy (meth) acrylate oligomers, and mixtures thereof, more preferably selected from the group consisting of polyester (meth) acrylate oligomers, epoxy (meth)acrylate oligomers, and mixtures thereof.

Suitable examples of epoxy (meth)acrylate oligomer include without limitation aliphatic epoxy (meth)acrylate oligomers, in particular mono(meth)acrylates, di(meth)acrylates and tri(meth)acrylates, and aromatic epoxy (meth) acrylate oligomers. Suitable examples of aromatic epoxy (meth)acrylate oligomers include bisphenol-A (meth)acrylate oligomers such as bisphenol-A mono(meth)acrylates, bisphenol-A di(meth)acrylates and bisphenol-A tri(meth) acrylates as well as alkoxylated (such as for example ethoxylated and propoxylated) bisphenol-A (meth)acrylate oligomers such as for example alkoxylated bisphenol-A mono(meth)acrylates, alkoxylated bisphenol-A di(meth) acrylates and alkoxylated bisphenol-A tri(meth)acrylates, preferably alkoxylated bisphenol-A di(meth)acrylates.

For embodiments wherein the UV-Vis radiation curable ink described herein is a cationically curable ink (i.e. a fully cationically curable ink not comprising radically curable compounds), said composition described herein preferably comprises from about 1 wt-% to about 10 wt-%, more preferably from about 1.1 wt-% to about 8 wt-% and still more preferably from about 1.1 wt-% to about 6 wt-%, of the one or more cationic photoinitiators (also referred in the art as photo-acid generators), the weight percents being based on the total weight of the UV-Vis radiation cationically curable ink. The one or more cationic photoinitiators described herein are onium salts preferably selected from the group consisting of azonium salts, oxonium salts, iodonium salts, sulfonium salts and mixtures thereof, more preferably selected from the group consisting of oxonium salts, iodonium salts, sulfonium salts, and mixtures thereof, and even more preferably selected from the group consisting of sulfonium salts, iodonium salts and mixtures thereof.

The one or more iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CFaSO_3^-$, more preferably $SbF_6^-$ or $PF_6^-$, still more preferably $PF_6^-$, and wherein the cationic moiety is preferably an aromatic iodonium ion, more preferably a iodonium ion comprising two aryl groups, wherein the two aryl groups may be independently substituted by one or more alkyls groups (such as for example methyl, ethyl, isobutyl, tertbutyl, etc.) one or more alkoxy groups, one or more nitro groups, one or more halogen containing groups, one or more hydroxy groups or a combination thereof.

Particularly suitable iodonium salts for the present invention are commercially available known under the name DEUTERON UV 1240, DEUTERON UV 1242, DEUTERON UV 2257, DEUTERON UV 1250, and DEUTERON UV 3100, all available from DEUTERON, Omnicat 250, Omnicat 440 and Omnicat 445, all available from IGM Resins, SpeedCure 937, SpeedCure 938 and SpeedCure 939, all available from Arkema (previously Lambson).

The one or more sulfonium salts described herein have a cationic moiety and an anionic moiety, wherein the anionic moiety is preferably $BF_4^-$, $B(C_6F_5)_4^-$, $PF_6^-$, $(PF_{6-h}(C_j F_{2j-1})_h)^-$ (where h is an integer from 1 to 5, and j is an integer from 1 to 4), $AsF_6^-$, $SbF_6^-$, $CF_3SO_3^-$, perfluoroalkyl sulfonate or pentafluoro-hydroxyantimonate, more preferably $SbF_6^-$ and wherein the cationic moiety is preferably an aromatic sulfonium ion, more preferably a sulfonium ion comprising two or more aryl groups, wherein the two or more aryl groups may be independently substituted by one or more alkyl groups (such as for example methyl, ethyl, isobutyl, tertbutyl, etc.) one or more alkoxy groups, one or more aryloxyl groups, one or more halogen containing groups, one or more hydroxy groups or a combination thereof. Suitable examples of sulfonium ions comprising two or more aryl groups include without limitation triarylsulfonium ions, diphenyl[4-(phenylthio)phenyl] sulfonium ion, bis[4-(diphenylsulfonio)phenyl] sulfonium ion, triphenylsulfonium ions, and tris[4-(4-acetylphenyl)sulfanylphenyl] sulfonium ion. Particularly suitable examples of sulfonium salts for the present invention are commercially available under the name SpeedCure 976, SpeedCure 976D, SpeedCure 976S and SpeedCure 992, all available from Arkema (previously Lambson), Esacure 1187, Omnicat 270, Omnicat 320, Omnicat 432 and Omnicat 550, all available from 1GM Resins, DoubleCure 1176, DoubleCure 1190 and DoubleCure 1172, all available from DoubleBond.

Other examples of useful cationic photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

For embodiments wherein the UV-Vis radiation curable ink described herein is a hybrid curable ink (i.e. an ink comprising both cationically curable compounds and radically compounds), said composition described herein comprises one or more free radical photoinitiators. Preferably, the amount of the one or more free radical photoinitiators in the UV-Vis radiation hybrid curable ink described herein is from about 1 wt-% to about 6 wt-%, the percent being based on the total weight of the UV-Vis radiation hydroid curable ink.

The one or more free radical photoinitiators are preferably selected form the group consisting of hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, thioxanthones, and mixtures thereof, more preferably selected form the group consisting of phosphine oxides, hydroxyketones, thioxanthones and mixtures thereof.

Suitable alpha-hydroxyketones include without limitation (1-[4-(2-hydroxyethoxy)-phenyl]-2-hydroxy-2-methyl-1-propan-1-one), 1-hydroxycyclohexyl phenyl ketone, 2-hydroxy-2-methyl-1-phenylpropan-1-one, 2-hydroxy-2-methyl-1-(4-tert-butyl)phenylpropan-1-one, 2-hydroxy-1-[4-[[4-(2-hydroxy-2-methylpropanoyl)phenyl]methyl] phenyl]-2-methylpropan-1-one, 2-hydroxy-1-[4-[4-(2-hydroxy-2-methylpropanoyl)phenoxy]phenyl]-2-methylpropan-1-one, and oligo[2-hydroxy-2-methyl-1-[4-(1-methylvinyl)phenyl]propanone].

Suitable acetophenones include without limitation 2,2-diethoxyacetophenone, and 2-methoxy-2-phenylacetophenone.

Suitable benzophenones include without limitation benzophenone, polymeric benzophenone derivatives, 2-methylbenzophenone, 3-methylbenzophenone, 4-methylbenzophenone, 2,4,6-trimethylbenzophenone, 3,3'-dimethyl-4-methoxybenzophenone, 4-phenylbenzophenone, 4-chlorobenzophenone, methyl-2-benzoylbenzoate, 4-(4-methylphenylthio)benzophenone, 4-hydroxybenzophenone laurate, and a mixture of 50% benzophenone and 50% 1-hydroxycyclohexyl phenyl ketone.

Suitable ketosulfones include without limitation 1-[4-(4-benzoylphenylsulfanyl)phenyl]-2-methyl-2-(4-methylphenylsulfonyl)propan-1-one.

Suitable benzyl ketals include without limitation 2,2-dimethoxy-2-phenylacetophenone.

Suitable benzoin ethers include without limitation 2-ethoxy-1,2-diphenylethanone, 2-isopropoxy-1,2-diphenylethanone, 2-isobutoxy-1,2-diphenylethanone, 2-butoxy-1, 2-diphenylethanone, 2,2-dimethoxy-1,2-diphenylethanone, and 2,2-diethoxyacetophenone.

Suitable phosphine oxides include without limitation 2,4, 6-trimethylbenzoyldiphenylphosphine oxide, ethyl phenyl (2,4,6-trimethylbenzoyl)phenylphosphinate, phenylbis(2,4, 6-trimethylbenzoyl)phosphine oxide, bis(2,6-dimethoxybenzoyl)-2,4,4-trimethylpentylphosphine oxide, substituted acyl-phosphine oxides, a mixture of diphenyl(2, 4,6-trimethylbenzoyl)phosphine oxide and 2-hydroxy-2-methylpropiophenone, a mixture of phenylbis(2,4,6-trimethylbenzoyl)phosphine oxide and 2-hydroxy-2-methylpropiophenone, a mixture of ethyl(2,4,6-trimethylbenzoyl)phenylphosphinate and 2-hydroxy-2-methylpropiophenone, and a mixture of phenylbis(2,4,6-trimethylbenzoyl)phosphine oxide and ethyl phenyl(2,4,6-trimethylbenzoyl)phenylphosphinate.

Suitable thioxanthones include without limitation 2-methyl thioxanthone, 2,4-diethylthioxanthone, 2-isopropylthioxanthone, 1-chloro-4-propoxythioxanthone, and polymeric thioxanthone derivatives.

Suitable phenylglyoxylates include without limitation methyl benzoylformate, 2-[2-oxo-2-phenyl-acetoxy-ethoxy] ethyl 2-oxo-2-phenylacetate, and a mixture of 2-[2-oxo-2-phenyl-acetoxy-ethoxy]ethyl 2-oxo-2-phenylacetate and oxy-phenyl-acetic acid 2-[2-hydroxy-ethoxy]-ethyl ester.

Preferably, the one or more free radical photoinitiators are phosphine oxides as described herein, and more preferably a mixture of phenylbis(2,4,6-trimethylbenzoyl)phosphine oxide and ethyl phenyl(2,4,6-trimethylbenzoyl)phenylphosphinate.

In order to enhance reactivity and/or improve handling (for example by replacing solid photoinitiators by a liquid blend), any blends of the free radical photoinitiators described herein may be used, wherein said blends include for example: blends of 2,4,6-trimethylbenzoyldiphenylphosphine oxide and 2-hydroxy-2-methyl-1-phenylpropan-1-one, sold e.g. by 1GM Resins under the tradename Omnirad 4265: blends of phenylbis(2,4,6-trimethylbenzoyl)phosphine oxide, ethyl(2,4,6-trimethylbenzoyl)phenylphosphinate and 2-hydroxy-2-methylpropiophenone, sold e.g. by IGM Resins under the tradename Omnirad 2022; blends of ethyl(2,4,6-trimethylbenzoyl)phenylphosphinate and phenylbis(2,4,6-trimethylbenzoyl)phosphine oxide, sold e.g. by IGM Resins under the tradename Omnirad 2100: blends of 2-hydroxy-2-methylpropiophenone and 1-hydroxycyclohexyl phenyl ketone, sold e.g. by 1GM Resins under the tradename Omnirad 1000; blends of oligo[2-hydroxy-2-methyl-1-[4-(1-methylvinyl)phenyl]propanone] and 2-hydroxy-2-methylpropiophenone, sold e.g. by IGM Resins under the tradename Esacure KIP100F; blends of 2-hydroxy-2-methylpropiophenone), ethyl(2,4,6-trimethylbenzoyl)phenylphosphinate and oligo[2-hydroxy-2-methyl-1-[4-(1 methylvinyl)phenyl]propanone], sold by IGM Resins under the tradename Omnirad BL 723; and blends of 2-hydroxy-2-methylpropiophenone, oligo[2-hydroxy-2-methyl-1-[4-(1-methylvinyl)phenyl]propanone], ethyl(2,4,6-trimethylbenzoyl) and 2,2-dimethoxy-1,2-diphenylethan-1-one, sold by IGM Resins under the tradename Omnirad BL 724.

The UV-Vis radiation curable ink described herein comprises a perfluoropolyether surfactant functionalized with one or more functional groups selected from the group consisting of hydroxyl, acrylate, methacrylate, and trialkoxysilyl, preferably two or more functional groups selected from the group consisting of hydroxyl, acrylate, methacrylate, and trialkoxysilyl. The perfluoropolyether surfactant functionalized with one or more functional groups selected from the group consisting of hydroxyl, acrylate, methacrylate, and trialkoxysilyl, comprises a perfluoropolyether backbone and one or more, preferably two or more, terminal functional groups selected from the group consisting of hydroxyl, acrylate, methacrylate and trialkoxysilyl is characterized by an average molecular weight (Mn) below about 2000 [g/mol]. As used herein, a perfluoropolyether backbone denotes a residue of a perfluoropolyether polymer comprising randomly distributed recurring units selected from perfluoromethyleneoxy ($—CF_2O—$) and perfluoroethyleneoxy ($—CF_2—CF_2O—$). The perfluoropolyether residue is connected to the terminal functional group directly or via a spacer selected from methylene(oxyethylene), 1,1-difluoroethylene-(oxyethylene), methylene-di(oxyethylene), 1,1-difluoroethylene-di(oxyethylene), methylene-tri(oxyethylene), 1,1-difluoroethylene-tri(oxyethylene), methylene-tetra (oxyethylene), 1,1-difluoroethylene-tetra(oxyethylene), methylene-penta(oxyethylene), 1,1-difluoroethylene-penta (oxyethylene), and a linear or branched hydrocarbon group, optionally fluorinated at the carbon atom connecting the spacer to the perfluoropolyether residue, containing one or more urethane groups, or one or more amide groups, and optionally one or more cyclic moieties, including saturated cyclic moieties (such as cyclohexylene) and aromatic cyclic moieties (such as phenylene). Preferably, the perfluoropolyether surfactant is functionalized with one or more hydroxyl functional groups.

In a further preferred embodiment, the perfluoropolyether surfactant functionalized with one or more functional groups selected from the group consisting of hydroxyl, acrylate, methacrylate, and trialkoxysilyl is a compound of general formula (IV) having an average molecular weight from about 1200 [g/mol] to about 2000 [g/mol]

$$(FG^1)_e—S^1—CF_2O—(CF_2CF_2O)_s(CF_2O)_t—CF_2—S^2—(FG^2)_f \quad \text{(IV)}$$

wherein
f and e are independently of each other an integer selected from 1, 2 and 3;
$FG^1$ and $FG^2$ are terminal functional groups selected independently of each other from the group consisting of $—OH$, $—OC(O)CH=CH_2$, $—OC(O)C(CH_3)$ $=CH_2$, and $—Si(OR^{20}$
$R^{20}$ is a $C_1$-$C_4$alkyl group;
$—S—$ represents a single bond or a spacer selected from:

wherein
$-J^1-$ is selected from wherein
$j^1$ is an integer comprised between 1 and 12, preferably between 4 and 10;
$L^5$ can be the same, or different in each occurrence and is a linear or branched alkyl radical containing from one to ten carbon atoms (such as methyl, ethyl, n-propyl, J-propyl, n-butyl, i-butyl, s-butyl, t-butyl, hexyl, octyl, and decyl), and preferably containing from one to three carbon atoms (such as methyl, ethyl, n-propyl, and i-propyl);
$L^6$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$I^5$ and $I^6$ are independently of each other integers comprised between 0 and 4, preferably comprised between 0 and 1; and
$-J^3-$ is selected from $—O—$, $—CH_2—$, $—CH(CH_3)—$, and $—C(CH_3)_2—$;
$-J^2-$ is selected from a is an integer comprised between 1 and 6, preferably between 1 and 3; and
b is an integer comprised between 1 and 6, preferably between 2 and 4;
$—S^2—$ represents a single bond or a spacer selected from

21

-continued

;

wherein

-J⁴- is selected from

, and

;

wherein j⁴ is an integer comprised between 1 and 12, preferably between 4 and 10;

L⁷ can be the same, or different in each occurrence and is a linear or branched alkyl radical containing from one to ten carbon atoms (such as methyl, ethyl, n-propyl, J-propyl, n-butyl, i-butyl, s-butyl, t-butyl, hexyl, octyl, and decyl), and preferably containing from one to three carbon atoms (such as methyl, ethyl, n-propyl, and d-propyl);

L⁸ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);

I⁷ and I⁸ are independently of each other integers comprised between 0 and 4, preferably comprised between 0 and 1; and -J⁶- is selected from —O—, —CH₂—, —CH(CH₃)—, and —C(CH₃)₂—;

-J⁵- is selected from

, and ;

wherein r is an integer comprised between 1 and 6, preferably between 1 and 3; and w is an integer comprised between 1 and 6, preferably between 2 and 4;

and wherein s and t are integers chosen so that the average molecular weight of the compound of general formula (IV) is from about 1200 [g/mol] to about 2000 [g/mol].

Preferably, in general formula (IV), FG¹ and FG² represent independently of each other —OC(O)CH=CH₂, or —OC(O)C(CH₃)=CH₂;

22

—S¹— represents

, wherein b has the meaning defined herein; and

—S²— represents

, wherein w has the meaning defined herein.

Also preferably, in general formula (IV), FG¹ and FG² represent —OH;

—S¹— represents a single bond or

, wherein a has the meaning defined herein;

—S²— represents a single bond or

, wherein r has the meaning defined herein; and the sum of o and r is comprised between 3 and 9.

Also preferably, in general formula (IV), FG¹ and FG² represent —Si(OR²⁰)₃; R²⁰ is a C₁-C₄alkyl group, preferably an ethyl group;

—S¹— represents

, wherein b has the meaning defined herein; and

—S²— represents

, wherein has the meaning defined herein. Thus, a preferred perfluoropolyether surfactant is a compound of general formula (IV-a)

(IV-a)

wherein
b and w are integers comprised between 1 and 6, preferably between 2 and 4;
s is a integer of between 2 and 6; and
q is an integer of between 2 and 4.

Particularly suitable examples of perfluoropolyether surfactant functionalized with one or more functional groups selected from the group consisting of hydroxyl, acrylate, methacrylate and trialkoxysilyl for the present invention are commercially available under the name Fluorolink® E10H, Fluorolink® MD700, Fluorolink® AD1700, Fluorolink® E-series, and Fluorolink® S10 from Solvay.

The UV-Vis radiation curable ink described herein comprises from about 3 wt-% to about 12 wt-% of a polyvinyl chloride copolymer containing at least 60 wt-% of vinyl chloride, preferably at least 63 wt-% of vinyl chloride. It is preferred that the polyvinyl chloride copolymer contains at the most 90 wt-% of vinyl chloride. Preferably, the polyvinyl chloride copolymer containing at least 60 wt-% of vinyl chloride is present in the ink described herein in an amount from about 4.9 wt-% to about 11.6 wt-%, and most preferably from about 6 wt-% to about 8.6 wt-%, wherein the weight percents are based on the total weight of the UV-Vis radiation curable ink.

Preferably, the polyvinyl chloride copolymer is selected from the group consisting of vinyl chloride—vinyl acetate copolymer, vinyl chloride—hydroxyalkylacrylate copolymer, such as vinyl chloride—2-hydroxypropyl acrylate copolymer, and vinyl chloride—hydroxyalkylacrylate—Z-alkylenedioic acid, dialkyl ester copolymer, such as vinyl chloride—2-hydroxypropyl acrylate—2-butenedioic acid (Z)—, dibutyl ester copolymer. The polyvinyl chloride copolymer has preferably an average molecular weight of between $3*10^4$ g/mol and about $8*10^4$, g/mol as determined by size exclusion chromatography using polystyrene as standard and tetrahydrofuran as solvent. Particularly suitable examples of polyvinyl chloride copolymer for the present invention are commercially available under the name Vinnol® H14/36, Vinnol® E22/48A, Vinnol® E 15/40 A and Vinnol® H 40/50 from Wacker.

The UV-Vis radiation curable ink described herein may contain up to about 25 wt-% of one or more organic solvents, the weight percent being based on the total weight of the UV-Vis radiation curable ink. The one or more solvents have a boiling point higher than 100° C. Suitable organic solvents to be used in the UV-Vis radiation curable inks described herein include without limitation ethyl-3-ethoxypropionate, 2-methoxy-1-methylethyl acetate, propylene glycol mono methyl ether, cyclopentanone, cyclohexanone, n-butanol, cyclohexanol, ethylene carbonate, propylene carbonate, butylene carbonate, and mixtures thereof.

The UV-Vis radiation curable ink described herein may further comprise one or more photosensitizers in conjunction with the one or more photoinitiators described herein in order to achieve efficient curing. Suitable examples of photosensitizers are known to those skilled in the art (e.g. in Industrial Photoinitiators, W. A. Green, CRC Press, 2010, Table 8.1 p 170). Preferred photosensitizers are those that are able to achieve efficient and fast curing with UV-LED light sources, such as thioxanthone derivatives, anthracene derivatives, naphthalene derivatives and titanocene derivatives (such as Omnirad 784 sold by IGM Resins). Particularly preferred are thioxanthone derivatives and anthracene derivatives, including without limitation isopropyl-thioxanthone (ITX), 1-chloro-2-propoxy-thioxanthone (CPTX), 2-chloro-thioxanthone (CTX), 2,4-diethyl-thioxanthone (DETX), 9,10-diethoxyanthracene (sold for example as Anthracure UVS-1101 sold by Kawasaki Kasei Chemicals Ltd) and 9,10-dibutyloxyanthracene (sold for example as Anthracure UVS-1331 sold by Kawasaki Kasei Chemicals Ltd) and mixtures thereof.

Alternatively, thioxanthone photosensitizers may be used in an oligomeric or polymeric form (such as Omnipol TX sold by 1GM Resins, Genopol* TX-2 sold by Rahn, or Speedcure 7010 sold by Arkema (previously Lambson)). When present, the one or more photosensitizers are preferably present in an amount from about 0.1 wt-% to about 2 wt-%, more preferably from about 0.2 wt-% to about 1 wt-%, the weight percent being based on the total weight of the UV-Vis radiation curable ink.

The UV-Vis radiation curable ink described herein may further comprise one or more antifoaming agents in an amount of less than about 2 wt-%, preferably of less than about 1 wt-%, the weight percent being based on the total weight of the UV-Vis radiation curable ink.

The UV-Vis radiation curable inks, described herein comprise from about 7.5 wt-% to about 20 wt-%, preferably from about 7.5 wt-% to about 15 wt-%, more preferably from about 10 wt-% to about 13 wt-%, of silver nanoplatelets, wherein said silver nanoplatelets bear a surface stabilizing agent of general formula (V)

(V)

wherein
the residue $R^A$ is a $C_2$-$C_4$alkyl group substituted with a hydroxy group;
the residue $R^B$ is selected from a $C_1$-$C_4$alkyl group, and a $C_2$-$C_4$alkyl group substituted with a hydroxy group; and
Cat$^+$ is an ammonium cation of general formula $^+NH_2R^CR^D$,
wherein the residue $R^C$ is a $C_2$-$C_4$alkyl group substituted with a hydroxy group; and the residue $R^D$ is selected from a $C_1$-$C_4$alkyl group, and a $C_2$-$C_4$alkyl group substituted with a hydroxy group.

The silver nanoplatelets described herein bearing the surface stabilizing agent of general formula (V) are readily dispersible in the UV-Vis radiation curable ink. Upon printing, the silver nanoplatelets described herein migrate from the mass of the ink layer obtained with the UV-Vis radiation curable ink described herein at the interface between the ink layer and air and at the interface between the ink layer and the substrate and align themselves to form a thin layer of silver nanoplatelets at said interfaces, thereby leading to the expedient development of the metallic yellow color observed in incident light. This property of the UV-Vis radiation curable ink described herein is particularly advantageous because on one side, the time required for the development of the metallic yellow color is compatible with the high-speed requirements of industrial printing of value documents, and on the other side, it enables production of dichroic security features with inks containing amounts of silver nanoplatelets as low as 7.5 wt-%, which drastically reduces the production costs, especially for dichroic security features having a large thickness of at least about 4 μm. Depending on the thickness of the security feature to be produced and the composition of the ink, the amount of the silver nanoplatelets in the UV-Vis radiation curable ink can be adjusted so that the metallic yellow color in reflected light is rapidly developed without impacting the hue and chroma of the blue color in transmitted light.

The silver nanoplatelets comprised in the UV-Vis radiation curable ink may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

The number mean diameter of the silver nanoplatelets is preferably in the range of 50 to 150 nm, more preferably 60 to 140 nm, still more preferably 70 to 120 nm, with a standard deviation of less than 60%, preferably less than 50%, wherein the number mean diameter is determined by transmission electron microscopy. The diameter of a silver nanoplatelet is the longest dimension of said silver nanoplatelet and corresponds to the maximum dimension of said silver nanoplatelet when oriented parallel to the plane of a transmission electron microscopy (TEM) image. As used herein, the term "number mean diameter of the silver nanoplatelets" refers to the number mean diameter determined by transmission electron microscopy (TEM) using the image analysis software (Thorsten Wagner ij-particlesizer v. 1.0.9; DOI: 10.5281/zenodo.820296) based on the measurement of at least 300, especially at least 500, randomly selected silver nanoplatelets oriented parallel to the plane of a transmission electron microscopy image (TEM), wherein the diameter of a silver nanoplatelet is the maximum dimension (maximum Feret diameter) of said silver nanoplatelet oriented parallel to the plane of a transmission electron microscopy image (TEM). TEM analysis was conducted using an EM 910 instrument from ZEISS (INST. 109) in bright field mode at an e-beam acceleration voltage of 100 kV. A dispersion of silver nanoplatelets in isopropanol at a suitable concentration, preferably lower than 24.1 wt-%, was used for conducting the TEM analysis.

The number mean thickness of the silver nanoplatelets is preferably in the range of about 5 nm to about 30 nm, more preferably about 7 nm to about 25 nm, still more preferably about 8 nm to about 25 nm, with a standard deviation of less than 50%, preferably less than 30%, wherein the number mean thickness is determined by transmission electron microscopy. The thickness of a silver nanoplatelet is the shortest dimension of said nanoplatelet and corresponds to the maximum thickness of said silver nanoplatelet. As used herein, the term "number mean thickness of the silver nanoplatelets" refers to the number mean thickness determined by transmission electron microscopy (TEM) based on the manual measurement of at least 50, especially at least 300, randomly selected silver nanoplatelets oriented perpendicular to the plane of the TEM image, wherein the thickness of the silver nanoplatelet is the maximum thickness of said silver nanoplatelet. TEM analysis was conducted using an EM 910 instrument from ZEISS (INST. 109) in bright field mode at an e-beam acceleration voltage of 100 kV. A dispersion of silver nanoplatelets in isopropanol at a suitable concentration, preferably lower than 24.1 wt-%, was used for conducting the TEM analysis. The thickness of at least 300 randomly selected silver nanoplatelets may be determined from the cross-sectional TEM images by fitting ellipses to the cross-sectioned particles by the software (ParticleSizer). The minor axis (the shortest diameter) of the fitted ellipse is taken as particle thickness.

The mean aspect ratio of the silver nanoplatelets (defined as the ratio between the number mean diameter and the number mean thickness) is preferably larger than about 2.0, more preferably larger than about 2.2 and still more preferably larger than about 2.5.

Preferably the number mean diameter of the silver nanoplatelets is in the range of about 50 nm to about 150 nm with a standard deviation of less than 60%, the number mean thickness is in the range of about 5 nm to about 30 nm with a standard deviation of less than about 50%, and the mean aspect ratio higher than about 2.0. More preferably, the number mean diameter of the silver nanoplatelets is in the range of about 70 nm to about 120 nm with the standard deviation being less than 50%, the number mean thickness of said silver nanoplatelets is in the range of about 8 nm to about 25 nm with the standard deviation being less than 30% and the mean aspect ratio of said silver nanoplatelets is higher than 2.5.

The silver nanoplatelets used in the UV-Vis radiation curable ink described herein are characterized by a highest wavelength absorption maximum of between 560 nm and 800 nm, preferably 580 nm and 800 nm, most preferably 600 nm to 800 nm. The highest wavelength absorption maximum was measured in water at ca. $5*10^{-5}$ M (mol/d) concentration of silver using a Varian Cary 50 UV-Visible spectrophotometer. The absorption maximum has a full width at half maximum (FWHM) value in the range of 50 nm to 500 nm, preferably 70 nm to 450 nm, more preferably 80 nm to 450 nm. The molar extinction coefficient of the silver nanoplatelets, measured at the highest wavelength absorption maximum, is higher than 4000 L/(cm*mol$_{Ag}$), especially higher than 5000 L/(cm*mol$_{Ag}$), very especially higher than 6000 L/(cm*mol$_{Ag}$).

The silver nanoplatelets contained by the UV-Vis radiation curable ink described herein bear a surface stabilizing agent of general formula (V)

(V)

wherein the residue $R^A$ is a $C_2$-$C_4$alkyl group substituted with a hydroxy group; the residue $R^B$ is selected from a $C_1$-$C_4$alkyl group, and a $C_2$-$C_4$alkyl group substituted with a hydroxy group; and $Cat^+$ is an ammonium cation of general formula $^+NH_2R^CR^D$, wherein the residue $R^C$ is a $C_2$-$C_4$alkyl group substituted with a hydroxy group; and the residue $R^D$ is selected from a $C_1$-$C_4$alkyl group, and a $C_2$-$C_4$alkyl group substituted with a hydroxy group. Without being bound by the theory, it is believed that the surface stabilizing agent of general formula (V) besides preventing the agglomeration and sedimentation of the silver nanoplatelets in the ink described herein, aids in promoting migration of the silver nanoplatelets from the mass of the ink layer obtained with the ink described herein at the interface between the ink layer and air and at the interface between the ink layer and the substrate.

The surface stabilizing agent of general formula (V) may be present in an amount from about 0.5% to about 5%, preferably from about 0.5% to about 4%, and more preferably in an amount of about 3%, of the weight percent (wt-%) of the silver nanoplatelets.

The term "$C_1$-$C_4$alkyl group" as used herein refers to a saturated linear or branched-chain monovalent hydrocarbon radical of one to four carbon atoms ($C_1$-$C_4$). Examples of $C_1$-$C_4$alkyl groups include methyl (Me, —$CH_3$), ethyl (Et, —$CH_2CH_3$), 1-propyl (n-Pr, n-propyl, —$CH_2CH_2CH_3$), 2-propyl (i-Pr, iso-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$) and 2-methyl-2-propyl (t-Bu, t-butyl, —$C(CH_3)_3$).

The term "$C_2$-$C_4$alkyl group substituted with a hydroxy group" refers to a linear or branched alkyl group having two to four carbon atoms, which is substituted by a hydroxy group (—OH). The $C_2$-$C_4$alkyl group may be substituted by one or two hydroxy groups.

In general formula (V), the residue $R^A$ may be a $C_2$-$C_4$alkyl group substituted with two hydroxy groups and the residue $R^B$ may be a $C_1$-$C_4$alkyl group.

In a preferred embodiment, the residues $R^A$ and $R^B$ are independently of each other a $C_2$-$C_4$alkyl group substituted with a hydroxy group, preferably one hydroxy group. Thus, in an embodiment the residues $R^A$ and $R^B$ are independently of each other selected from the group consisting of —$CH_2CH_2OH$, —$CH_2CH(OH)CH_3$, —$CH_2CH_2CH_2OH$, —$CH(CH_3)(CH_2OH)$, —$CH_2CH(OH)CH_2CH_3$, —$CH_2CH_2CH(OH)CH_3$—$CH_2CH_2CH_2CH_2OH$, —$CH(CH_3)CH(OH)CH_3$, —$CH(CH_2OH)CH_2CH_3$, —$CH(CH_3)CH_2CH_2OH$, —$CH_2CH(CH_2OH)CH_3$, —$CH_2C(CH_3)(OH)CH_3$, —$CH_2CH(CH_3)CH_2(OH)$, —$CH_2C(OH)(CH_3)_2$, —$CH_2C(CH_3)(CH_2OH)$, more preferably selected from the group consisting of —$CH_2CH_2OH$, —$CH_2CH(OH)CH_3$, and —$CH_2CH_2CH_2OH$. The residues $R^A$ and $R^B$ may be the identical, or may be different.

In general formula (V), the residue $R^C$ may be a $C_2$-$C_4$alkyl group substituted with two hydroxy groups and the residue $R^D$ may be a $C_1$-$C_4$alkyl group.

In a preferred embodiment, the residues $R^C$ and $R^D$ are independently of each other a $C_2$-$C_4$alkyl group substituted with a hydroxy group, preferably one hydroxy group. Thus, in an embodiment the residues $R^C$ and $R^D$ are independently of each other selected from the group consisting of —$CH_2CH_2OH$, —$CH_2CH(OH)CH_3$, —$CH_2CH_2CH_2OH$, —$CH(CH_3)(CH_2OH)$, —$CH_2CH(OH)CH_2CH_3$, —$CH_2CH_2CH(OH)CH_3$, —$CH_2CH_2CH_2CH_2OH$, —$CH(CH_3)CH(OH)CH_3$, —$CH(CH_2OH)CH_2CH_3$, —$CH_2C(CH_3)(OH)CH_3$, —$CH_2CH(CH_3)CH_2(OH)$, —$CH_2C(OH)(CH_3)_2$, —$CH_2C(CH_3)(CH_2OH)$, more preferably selected from the group consisting of —$CH_2CH_2OH$, —$CH_2CH(OH)CHs$, and —$CH_2CH_2CH_2OH$. The residues $R^C$ and $R^D$ may be the identical, or may be different.

Preferably, in general formula (V) the residues $R^A$, $R^B$, $R^C$ and $R^D$ are independently of each other a $C_2$-$C_4$alkyl group substituted with one hydroxy group. More preferably, in general formula (I) the residues $R^A$, $R^B$, $R^C$ and $R^D$ are independently of each other selected from the group consisting of —$CH_2CH_2OH$, —$CH_2CH(OH)CH_3$, and —$CH_2CH_2CH_2OH$. Even more preferably, in general formula (V) the residues $R^A$, $R^B$, $R^C$ and $R^D$ represent —$CH_2CH_2OH$.

To prevent agglomeration and sedimentation of the silver nanoplatelets upon storage, the silver nanoplatelets may bear on their surface further surface stabilizing agents.

In a preferred embodiment, the silver nanoplatelets bear on their surface a further surface stabilizing agent of general formula (VI)

(VI)

wherein $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_4$alkyl, or phenyl;

Y is O, or $NR^8$;

$R^8$ is H, or $C_1$-$C_8$alkyl;

k1 is an integer in the range of from 1 to 500;

k2 and k3 are independently of each other 0, or integers in the range of from 1 to 250;

k4 is 0, or 1; and k5 is an integer in the range of from 1 to 5. Preferably, in general formula (II) Y represents O. Also preferably, in general fomula (VI) k4 is 0.

The surface stabilizing agent of general formula (II) has preferably an average molecular weight (Mn) of from 1000 to 20000 [g/mol], and more preferably from 1000 to 10000 [g/mol], most preferably from 1000 to 6000 [g/mol].

If the surface stabilizing agent of formula (I) comprises, for example, ethylene oxide units (EO) and propylene oxide units (PO), the order of (EO) and (PO) may be fixed (block copolymers), or may not be fixed (random copolymers).

Preferably, in general formula (VI), $R^1$ is H, or $C_1$-$C_{18}$alkyl, $R^2$, $R^3$, $R^4$, $R^5$, $R^6$ and $R^7$ are independently of each other H, $CH_3$, or $C_2H_5$, k1 is an integer in the range of from 22 to 450, k2 and k3 are independently of each other 0, or integers in the range of from 1 to 250, k4 is 0, or 1, and k5 is an integer in the range of from 1 to 5. More preferably, in general formula (II) $R^1$ is H, or $C_1$-$C_4$alkyl, $R^2$, $R^3$, $R^4$, $R^5$, $R^6$ and $R^7$ are independently of each other H, or $CH_3$, k1 is an integer in the range of from 22 to 450, k2 and k3 are independently of each other 0, or integers in the range of from 1 to 100, k4 is 0, k5 is an integer in the range of from 1 to 4.

The most preferred surface stabilizing agent of general formula (VI) has the general formula (VI-a)

$$R^1 \underset{O}{\overset{O}{\longleftrightarrow}} \left[ \underset{k1}{O} \right]_{k1} \overset{O}{\longleftrightarrow} S^{\cdots\cdots} , \qquad (VI\text{-}a)$$

wherein $R^1$ is H, or a $C_1$-$C_8$alkyl group, especially H, or CHs, and
k1 is an integer in the range of from 22 to 450, especially 22 to 150.

The preferred surface stabilizing agents of general formula (VI) are derived from MPEG thiols (poly(ethylene glycol) methyl ether thiols) having an average molecular weight ($M_n$) of 2000 to 6000, such as, for example, MPEG 2000 thiol, MPEG 3000 thiol, MPEG 4000 thiol, MPEG 5000 thiol, MPEG 6000 thiol, PEG thiols (O-(2-mercapto-ethyl)-poly(ethylene glycol)) having an average $M_n$ of 2000 to 6000, such as, for example, PEG 2000 thiol, PEG 3000 thiol, PEG 4000 thiol, PEG 5000 thiol, PEG 6000 thiol.

The silver nanoplatelets contained by the security ink may further bear a surface stabilizing agent which is a polymer, or copolymer described in WO 2006/074969A1, which can be obtained by a process comprising the steps:

i-1) polymerizing in a first step one or more ethylenically unsaturated monomers in the presence of at least one nitroxylether having the structural element $$\overset{\diagdown}{\underset{\diagup}{N}} - O - X,$$

wherein X represents a group having at least one carbon atom and is such that the free radical X· derived from X is capable of initiating polymerization; or
i-2) polymerizing in a first step one or more ethylenically unsaturated monomers in the presence of at least one stable free nitroxyl radical $$\overset{\diagdown}{\underset{\diagup}{N}} - O\cdot$$

and a free radical initiator;
wherein at least one monomer used in the steps i-1) or i-2) is a $C_1$-$C_6$alkyl or hydroxy $C_1$-$C_6$alkyl ester of acrylic or methacrylic acid; and optionally
ii) a second step, comprising the modification of the polymer or copolymer prepared under i-1) or i-2) by a transesterification reaction, an amidation, hydrolysis or anhydride modification or a combination thereof.

The monomer in step i-1) or i-2) is preferably selected from 4-vinyl-pyridine or pyridinium-ion, 2-vinyl-pyridine or pyridinium-ion, 1-vinyl-imidazole or imidazolinium-ion, or a compound of formula $CH_2$=$C(R_a)$(C=Z)—$R_b$, wherein $R_a$ is hydrogen or methyl;
$R_b$ is $NH_2$, $O^-(Me^+)$, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, unsubstituted di($C_1$-$C_{18}$alkyl) amino, hydroxy-substituted $C_1$-$C_{13}$alkylamino or hydroxy-substituted di($C_1$-$C_{18}$alkyl)amino, —O$(CH_2)_y$ $NR^{15}R^{16}$ or —O$(CH_2)_y$$NR^{15}R^{16}An^-$, —N$(CH_2)_y$ $NR^{15}R^{16}$, or —N$(CH_2)_y$$N^+HR^{15}R^{16}An^-$, wherein
$An^-$ is an anion of a monovalent organic, or inorganic acid;
y is an integer from 2 to 10;
$R^{15}$ is saturated or unsaturated, linear or branched chain alkyl with 1-22 carbon atoms;
$R^{16}$ is saturated or unsaturated, linear or branched chain alkyl with 1-22 carbon atoms;
$Me^+$ is a monovalent metal atom or the ammonium ion; and
Z is oxygen or sulfur.

The second step ii) is preferably a transesterification reaction. In step ii) the alcohol is preferably an ethoxylate of formula $R_c$—[O—$CH_2$—$CH_2$—]$_c$—OH, wherein $R_c$ is saturated or unsaturated, linear or branched chain alkyl with 1-22 carbon atoms, or alkylaryl or dialkylaryl with up to 24 carbon atoms and c is 1 to 150.

Preferably, step i-1) or i-2) is carried out twice and a block copolymer is obtained wherein in the first or second radical polymerization step the monomer or monomer mixture contains 50% to 100% by weight, based on total monomers, of a $C_1$-$C_6$ alkyl ester of acrylic or methacrylic acid and in the second or first radical polymerization step respectively, the ethylenically unsaturated monomer or monomer mixture contains at least a monomer without primary or secondary ester bond.

In the first polymerization step, the monomer or monomer mixture contains from 50% to 100% by weight based on total monomers of a $C_1$-$C_6$alkyl ester of acrylic or methacrylic acid (first monomer) and in the second polymerization step the ethylenically unsaturated monomer or monomer mixture comprises 4-vinyl-pyridine or pyridinium-ion, 2-vinyl-pyridine or pyridinium-ion, vinyl-imidazole or imidazolinium-ion, 3-dimethylaminoethylacrylamide, 3-dimethylaminoethylmethacrylamide, or corresponding ammonium ion, 3-dimethylaminopropylacrylamide, or corresponding ammonium ion, or 3-dimethylaminopropyl-methacrylamide, or corresponding ammonium ion (second monomer).

Preferably, the nitroxylether has the following structure

The surface stabilization agent is preferably a copolymer which can be obtained by a process comprising the steps:
i-2) polymerizing in a first step a first monomer, which is a $C_1$-$C_6$alkyl or hydroxy $C_1$-$C_6$alkyl ester of acrylic or methacrylic acid, and a second monomer which is selected from selected from 4-vinyl-pyridine or pyridinium-ion, 2-vinyl-pyridine or pyridinium-ion, 1-vinyl-imidazole or imidazolinium-ion, 3-dimethylamino-ethylacrylamide, 3-dimethylaminoethylmethacrylamide, 3-dimethyl-amino-propylacrylamide, and 3-dimethylaminopropylmethacrylamide; in the presence of at least one nitroxy-lether having the structural element and ii) a second step, comprising the modification of the polymer or copolymer prepared under i-1) by a trans-esterification reaction, wherein the alcohol in step ii) is an ethoxylate of formula $R_c$—[O—CH$_2$—CH$_2$]$_c$—OH, wherein $R_c$ is saturated or unsaturated, linear or branched chain alkyl with 1-22 carbon atoms, or alkylaryl or dialkylaryl with up to 24 carbon atoms and c is 1 to 150.

Preferably the surface stabilizing agent obtained via the process described herein is a copolymer of the following formula (VII)

(VII)

wherein $R^{17a}$, $R^{17b}$ and $R^{17c}$ are independently of each other H, or methyl;

$R^{18a}$ and $R^{18b}$ are H, or methyl;

$R^{19a}$ is saturated or unsaturated, linear or branched chain alkyl with 1-22 carbon atoms;

$R^{19b}$ is $R_c$—[O—CH—CH$_2$—]$_c$—O—

$R^{19c}$ is

—C(═O)—NH—(CH$_2$)$_y$NR$^{15}$R$^{16}$, or —C(═O)—NH—(CH$_2$)$_y$N$^+$HR$^{15}$R$^{16}$An$^-$;

wherein

An$^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, $R_c$ is saturated or unsaturated, linear or branched chain alkyl with 1-22 carbon atoms, or alkylaryl or dialkylaryl with up to 24 carbon atoms and c is 1 to 150, and y1, y$^2$ and y3 are independently of each other integers from 1 to 200. In general formula (VII) the order of monomers with indices y1 and y$^2$ may be fixed (block copolymers) or not fixed (random copolymers).

Surface stabilizing agents of general formula (VII) have been described in the international patent application publication number WO 2006/074969A1.

A preferred surface stabilizing agent of general formula (VII) is a compound of general formula (VII-a)

(VII-a)

wherein $R^{18a}$ and $R^{18b}$ are H, or methyl;

y1, y2 and y3 are independently of each other integers from 1 to 200; and c is an integer from 1 to 150. The order of monomers with indices y1 and y2 may be fixed (block copolymers) or not fixed (random copolymers).

Examples of preferred copolymers to be used as surface stabilizing agents are the copolymers described in Example A3 and Example A6 of WO 2006/074969A1.

To improve the stability of optical properties of the silver nanoplatelets upon storage or heat exposure, said silver nanoplatelets may bear a further surface stabilizing agent of general formula (VIII)

(VIII)

wherein $R^9$ is a hydrogen atom, or a group of formula —CHR$^{11}$—N(R$^{12}$)(R$^{13}$);

$R^{10}$ is a hydrogen atom, a halogen atom, a C$_1$-C$_8$alkoxy group, or a C$_1$-C$_8$alkyl group;

$R^{11}$ is H, or C$_1$-C$_8$alkyl; and $R^{12}$ and $R^{13}$ are independently of each other a C$_1$-C$_4$alkyl, a hydroxyC$_1$-C$_8$alkyl group, or a group of formula —[(CH$_2$CH$_2$)—O]$_{n1}$—CH$_2$CH$_2$—OH, wherein n1 is 1 to 5.

Examples of compounds of formula (VIII) include, but are not limited to:

A dispersion of silver nanoplatelets to be used for preparing the UV-Vis radiation curable ink described herein may be obtained by using the method comprising the following steps:

1) preparing a solution comprising a silver precursor, a compound of formula (VI)

(VI)

wherein $R^1$ is H, $C_1$-$C_{18}$alkyl, phenyl, $C_1$-$C_8$alkylphenyl, or $CH_2COOH$;

$R^2$, $R^3$, $R^4$, $R^5$, $R^6$ and $R^7$ are independently of each other H, $C_1$-$C_8$alkyl, or phenyl;

Y is O, or $NR^1$;

$R^8$ is H, or $C_1$-$C_8$alkyl;

k1 is an integer in the range of from 1 to 500;

k2 and k3 are independently of each other 0, or integers in the range of from 1 to 250;

k4 is 0, or 1; and k5 is an integer in the range of from 1 to 5;

a polymer, or copolymer, which can be obtained by a process comprising the steps:

i-1) polymerizing in a first step one or more ethylenically unsaturated monomers in the presence of at least one nitroxylether having the structural element wherein X represents a group having at least one carbon atom and is such that the free radical X· derived from X is capable of initiating polymerization; or i-2) polymerizing in a first step one or more ethylenically unsaturated monomers in the presence of at least one stable free nitroxyl radical and a free radical initiator: wherein at least one monomer used in the steps i-1) or i-2) is a $C_1$-$C_6$ alkyl or hydroxy $C_1$-$C_6$ alkyl ester of acrylic or methacrylic acid; and optionally ii) a second step, comprising the modification of the polymer or copolymer prepared under i-1) or i-2) by a transesterification reaction, an amidation, hydrolysis or anhydride modification or a combination thereof, water, and optionally a defoamer;

2) preparing a solution, comprising a reducing agent, which comprises at least one boron atom in the molecule, and water;

3) adding the solution obtained at step 1) to the solution obtained at step 2), and adding one or more complexing agents;

4) adding a hydrogen peroxide solution in water; and 5) adding one or more surface stabilizing agents to the mixture obtained at step 4).

The silver precursor is a silver(I) compound selected from the group consisting of $AgNO_3$; $AgClO_4$; $Ag_2SO_4$; AgCl; AgF; AgOH; $Ag_2O$; $AgBF_4$; $AgIO_3$; $AgPF_6$; $R^{200}CO_2Ag$, $R^{200}SO_3Ag$, wherein $R^{200}$ is unsubstituted or substituted $C_1$-$C_{18}$alkyl, unsubstituted or substituted $C_5$-$C_6$cycloalkyl, unsubstituted or substituted $C_2$-$C_{18}$aralkyl, unsubstituted or substituted $C_5$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids and mixtures thereof, preferably from the group consisting of silver nitrate, silver acetate, silver perchlorate, silver methanesulfonate, silver benzenesulfonate, silver toluenesulfonate silver trifluoromethanesulfonate, silver sulfate, silver fluoride and mixtures thereof, and more preferably is silver nitrate.

The reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, and amine-borane complexes, such as diethylaniline borane, tert-butylamine borane, morpholine borane, dimethylamine borane, triethylamine borane, pyridine borane, ammonia borane and mixtures thereof, Sodium borohydride is most preferred.

The one or more complexing agents are selected from the group of chlor-containing compounds, which are capable to liberate chloride ions under reaction conditions, such as metal chlorides, alkyl or aryl ammonium chlorides, phosphonium chlorides; primary or secondary amines and corresponding ammonium salts, such as methyl amine or dimethylamine; ammonia and corresponding ammonium salts; and aminocarboxylic acids and their salts, such as ethylenediaminetetraacetic acid.

Non limiting examples of complexing agents include ammonia, methylamine, dimethylamine, ethylamine, ethylenediamine, diethylenetriamine, ethylene-diarnine-tetraacetic acid (EDTA); ethylenediamine N,N'-disuccinic acid (EDDS); methyl glycine diacetic acid (MGDA); diethylene triamine pentaacetic acid (DTPA); propylene diamine tetracetic acid (PDTA); glutamic acid N,N-diacetic acid (N,N-dicarboxymethyl glutarnic acid tetrasodiurn salt (GLDA); nitrilotriacetic acid (NTA), and any salts thereof; N-hydroxyethylethylenediaminetri-acetic acid (HEDTA), triethylenetetraarninehexaacetic acid (TTHA), N-hydroxyethyliminodiacetic acid (HEIDA), dihydroxyethylglycine (DHEG), ethylenediarninetetrapropionic acid (EDTP) and derivatives thereof, such as, for example, trisodium salt of methylglycinediacetic acid (Na$_3$MGDA) and tetrasodium salt of EDTA.

The defoamer is a compound or composition, capable to suppress foam formation in the reaction mixture, such as, for example, commercially available TEGO® Foamex 1488, 1495, 3062, 7447, 800, 8030, 805, 8050, 810, 815N, 822, 825, 830, 835, 840, 842, 843, 845, 855, 860, 883, K 3, K 7, K 8, N, Antifoam SE-15 from Sigma, Struktol SB-2080 and the like. The amount of the defoamer is in the range of from 0.00001% to 5% by weight based on total weight of reaction mixture prior to hydrogen peroxide addition, preferably from 0.00010% to 3% and more preferably from 0.001% to 2% by weight.

The defoamer can be added to the solution prepared at step 1) and/or to the solution prepared at step 2).

The reaction of silver nanoplatelets formation is carried out by gradually adding the silver precursor solution to the reducing agent solution, whereas the temperature of both solutions is in the range of –3° C. to 40° C. and the gradual addition is completed within 15 minutes to 24 h time.

The silver nanoplatelets obtained at step 4) and/or 5) can be submitted to further purification and/or isolation methods, such as decantation, (ultra)filtration, (ultra)centrifugation, reversible or irreversible agglomeration, phase transfer with organic solvent, and combinations thereof. The dispersion of silver nanoplatelets may contain up to about 99 wt-% silver nanoplatelets, preferably from about 5 wt-% to 99 wt-% silver nanoplatelets, more preferably from about 5 wt-% to about 90 wt-% silver nanoplatelets, the wt-% being based on the total weight of the dispersion.

Starting from the silver nanoplatelets obtained by purification and/or isolation, the silver nanoplatelets bearing the surface stabilizing agent of general formula (V) can be prepared by:

i) reacting CS$_2$ with an amine of formula R$^A$R$^B$NH in the presence of the silver nanoplatelets and subsequent treatment with R$^C$R$^D$NH, or ii) by reacting CS$_2$ with an amine of formula R$^A$R$^B$NH and subsequent treatment with R$^C$R$^D$NH to obtain the dithiocarbamate of general formula (I), which is then reacted with the silver nanoplatelets.

Silver nanoplatelets bearing a dithiocarbamate of general formula (V), wherein R$^A$ is identical with R$^C$ and R$^B$ is identical with R$^D$ can be obtained starting from the silver nanoplatelets subjected to purification and/or isolation methods:

iii) by reacting CS$_2$ with an amine of formula R$^A$R$^B$NH in the presence of the silver nanoplatelets; or iv) by reacting CS$_2$ with an amine of formula R$^A$R$^B$NH to obtain the dithiocarbamate of general formula $$\begin{array}{c} R^A \\ \diagdown \\ N \\ \diagup \\ R^B \end{array}\!\!\!\!\begin{array}{c} S^- \\ \| \\ \diagup \\ S \end{array} \quad {}^+H_2N\!\!\begin{array}{c} R^A \\ \diagup \\ \diagdown \\ R^B \end{array}$$

which is then reacted with the silver nanoplatelets.

The silver nanoplatelets described herein are disclosed by the European patent application number 20206698.1 entitled "Compositions, comprising silver nanoplatelets" filed by BASF SE on Nov. 10, 2020.

According to one embodiment, the UV-Vis radiation curable ink is a cationically curable composition comprising the silver nanoplatelets described herein; the one or more cycloaliphatic epoxides described herein (preferably according to formula (I) or (II) described herein); the one or more cationic photoinitiators described herein (preferably selected from the group consisting of the iodonium salts, the sulfonium salts and the mixtures thereof described therein); the one or more vinyl ethers, one or more oxetanes described herein or the epoxides other than a cycloaliphatic epoxide described herein; the perfluoropolyether surfactant described herein (preferably the perfluoropolyether surfactants being functionalized with one or more hydroxyl functional groups described herein); the polyvinyl chloride copolymer described herein, optionally the one or more photosensitizers described herein (preferably the thioxanthones described herein); and optionally the one or more organic solvents described herein, preferably in the amounts described herein. According to one embodiment, the UV-Vis radiation curable ink is a cationically curable composition comprising the silver nanoplatelets described herein; the one or more cycloaliphatic epoxides described herein (preferably according to formula (I) or (II) described herein); the one or more cationic photoinitiators described herein (preferably selected from the group consisting of the iodonium salts, the sulfonium salts and the mixtures thereof described therein); the perfluoropolyether surfactant described herein (preferably the perfluoropolyether surfactants being functionalized with one or more hydroxyl functional groups described herein); the polyvinyl chloride copolymer described herein, optionally the one or more photosensitizers described herein (preferably the thioxanthones described herein); and the one or more organic solvents described herein, preferably in the amounts described herein.

According to one embodiment, the UV-Vis radiation curable ink is a hybrid curable composition comprising the silver nanoplatelets described herein; the one or more cycloaliphatic epoxides described herein (preferably according to formula (I) or (II) described herein); the one or more cationic photoinitiators described herein (preferably selected from the group consisting of the iodonium salts, the sulfonium salts and the mixtures thereof described therein); the one or more vinyl ethers, one or more oxetanes described herein or the epoxides other than a cycloaliphatic epoxide described herein; the one or more radically curable compounds described therein (in particular the acrylate oligomers and acrylate monomers described herein, preferably the(meth)acrylates described herein), the one or more free radical photoinitiators described herein (the phosphine oxides described herein); the perfluoropolyether surfactant described herein (preferably perfluoropolyether surfactants being functionalized with one or more hydroxyl functional groups described herein); the polyvinyl chloride copolymer described herein; optionally the one or more photosensitizers described herein (preferably the anthracenes described herein); and optionally the one or more organic solvents described herein, preferably in the amounts described herein. According to one embodiment, the UV-Vis radiation curable ink is a hybrid curable composition comprising the silver nanoplatelets described herein; the one or more cycloaliphatic epoxides described herein (preferably according to formula (I) or (II) described herein); the one or more cationic photoinitiators described herein (preferably selected from the group consisting of the iodonium salts, the sulfonium salts and the mixtures thereof described therein); the one or more radically curable compounds described therein (in particular the acrylate oligomers and acrylate monomers described herein, preferably the(meth)acrylates described herein), the one or more free radical photoinitiators described herein (the phosphine oxides described herein); the perfluoropolyether surfactant described herein (preferably perfluoropolyether surfactants being functionalized with one or more hydroxyl functional groups described herein); the polyvinyl chloride copolymer described herein; optionally the one or more photosensitizers described herein (preferably the anthracenes described herein); and the one or more organic solvents described herein, preferably in the amounts described herein.

The method described herein further comprises, subsequently to the step a) described herein, the step b) of applying the top coating composition described herein at least partially on top of the coating layer (x10) described herein. The top coating composition described herein is applied in the form of the one or more indicia (x30) described herein and partially overlaps (i.e. overlaps in at least one area) the coating layer (x10) described herein, wherein the UV-Vis radiation curable ink comprising of the coating layer (x10) is still in a wet and unpolymerized state.

As used herein, the term "indicium"/"indicia" shall mean continuous and discontinuous layer/layers consisting of distinguishing marking/markings or sign/signs or pattern/patterns. Preferably, the one or more indicia (x30) described herein are selected from the group consisting of codes, symbols, alphanumeric symbols, motifs, geometric patterns (e.g. circles, triangles and regular or irregular polygons), letters, words, names, numbers, logos, drawings, portraits and combinations thereof. Examples of codes include encoded marks such as an encoded alphanumeric data, a one-dimensional barcode, a two-dimensional barcode, a QR code, datamatrix and IR-reading codes. The one or more indicia (x30) described herein may be solids indicia and/or raster indicia.

The top coating composition described herein is applied in the form of the one or more indicia described herein (x30) by an application process, preferably a contactless fluid microdispensing process, more preferably a process selected from the group consisting of spray coating, aerosol jet printing, electrohydrodynamics printing, slot die coating and inkjet printing, still more preferably by an inkjet printing process, wherein said contactless fluid microdispensing printing processes are variable information printing methods allowing for the unique production of the one or more indicia (x30) on or in the security features described herein. The application process is chosen as a function of the design and resolution of the one or more indicia to be produced.

The top coating composition described herein is applied as described herein with an ink deposit an ink deposit greater than about 0.8 g/m$^2$, preferably greater than or equal to 1.0 g/m$^2$, said ink deposit being measured as described hereafter in the experimental part in [0209] and [0210].

Spray coating is a technique involving forcing the composition through a nozzle whereby a fine aerosol is formed. A carrier gas and electrostatic charging may be involved to aid in directing the aerosol at the surface that is to be printed. Spray printing allows to print spots and lines. Suitable compositions for spray printing typically have a viscosity between about 10 mPa·s and about 1 Pa·s (25° C., 1000 s$^{-1}$ as described above). Resolution of spray coating printing lies in the millimeter range. Spray printing is described for example in F. C. Krebs, Solar Energy Materials & Solar Cells (2009), 93, page 407.

Aerosol jet printing (AJP) is an emerging contactless direct write approach aimed at the production of fine features on a wide range of substrates. AJP is compatible with a wide material range and freeform deposition, allows high resolution (in the order of about 10 micrometers) coupled with a relatively large stand-off distance (e.g. 1-5 mm), in addition to the independence of orientation. The technology involves aerosol generation using either ultrasonic or pneumatic atomizer to generate an aerosol from compositions typically having a viscosity between about 1 mPa·s and about 1 Pa·s (25° C., 1000 s$^{-1}$ as described above). Aerosol jet printing is described for example in N. J. Wilkinson et al., The International Journal of Advanced Manufacturing Technology (2019) 105:4599-4619.

Electrohydrodynamic inkjet printing is a high resolution inkjet printing technology. Electrohydrodynamics inkjet printing technology makes use of externally applied electric fields to manipulate droplets sizes, ejection frequencies and placement on the substrate to get higher resolution than convention inkjet printing, while keeping a high production speed. The resolution of electrohydrodynamics inkjet printing is about two orders of magnitude higher than conventional inkjet printing technology; thus, it can be used for the orienting of nano- and micro-scale patterns. Electrohydrodynamic inkjet printing may be used both in DOD or in continuous mode. Compositions for electrohydrodynamics inkjet printing typically have a viscosity between 1 mPa·s and about 1 Pa·s (25° C., 1000 s$^{-1}$ as described above). Electrohydrodynamic inkjet printing technology is described for example P. V. Raje and N. C. Murmu, International Journal of Emerging Technology and Advanced Engineering, (2014), 4(5), pages 174-183.

Slot die-coating is a 1-dimensional coating technique. Slot-die coating allows for the coating of stripes of material which is well suited for making a multilayer coating with stripes of different materials layered on top of each other. The alignment of the pattern is produced by the coating head being translated along the direction perpendicular to the direction of the web movement. A slot die-coating head comprises a mask that defines the slots of the coating head through which the slot-die coating ink is dispersed. An example of a slot-die coating head is illustrated in F. C. Krebs, Solar Energy Materials & Solar Cells (2009), 93, page 405-406. Suitable compositions for slot die-coating typically have a viscosity between 1 mPa·s and about 20 mPa·s (25° C., 1000 si as described above).

According to one embodiment, the top coating composition described herein is printed in the form of the one or more indicia (x30) described herein by an inkjet printing process, preferably a continuous inkjet (CI) printing process or a drop-on-demand (DOD) inkjet printing process, more preferably a drop-on-demand (DOD) inkjet printing process. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet, valve jet (viscosity between 1 mPa·s and about 50 mPa·s (25° C., 1000 s$^{-1}$ as described above) and electrostatic process.

According to a preferred embodiment, the top coating composition described herein is a DOD top coating composition preferably having a viscosity less than about 40 mPa·s, more preferably a viscosity between about 0.5 mPa·s and about 30 mPa·s and still more preferably viscosity between about 0.5 mPa·s and about 20 mPa·s, at 25° C. and 1000 s$^{-1}$ using a rotational viscosimeter DHR-2 from TA Instruments, having a cone-plane geometry and a diameter of 40 mm.

According to one embodiment for UV-Vis radiation cationically curable inks described herein, the top coating composition described herein may comprise one or more cationically curable compounds, one or more hybrid curable compounds, one or more solvents, a blend of one or more radically curable compounds and one or more radical photoinitiators or a mixture thereof;

wherein the one or more cationically curable compounds may be those described herein for the UV-Vis radiation curable ink described herein, preferably selected from the group consisting of vinyl ethers, propenyl ethers, cyclic ethers such as epoxides, glycidyl ethers, oxetanes, and tetrahydrofuranes, and mixtures thereof such as those described herein and more preferably selected from the group consisting of vinyl ethers, cyclic ethers such as epoxides, glycidyl ethers, oxetanes and mixtures thereof such as those described herein, more preferably selected from the group consisting of vinyl ethers, glycidyl ethers, oxetanes and mixtures thereof such as those described herein; wherein the glycidyl ethers are selected from the group consisting of monoglycidyl ethers (including for example alkyl (such as for example methyl, ethyl, propyl, isopropyl, butyl, tertbutyl, 2-ethylhexyl and C8-C18 (used alone or in mixtures thereof)) monoglycidyl ethers, cycloalkyl (such as for example cyclopropyl, cyclobutyl, cyclopentyl and cyclohexyl) monoglycidyl ethers, alkenyl (such as for example allyl and crotyl) monoglycidyl ethers, alkynyl (such as for example propargyl) monoglycidyl ethers, phenyl (such as for example phenyl, cresyl, tertbutylphenyl and nonyl phenyl) monoglycidyl ethers) and furfuryl monoglycidyl ethers), diglycidyl ethers (including for example diglycidyl ether, 1,2-propanediol diglycidyl ether, 1,3-propanediol diglycidyl ether, 1,4-butanediol diglycidyl ether, 1,6-hexanediol diglycidyl ether, neopentyl glycol diglycidyl ether, cyclohexane dimethanol diglycidyl ether, 4,4'-dihydroxyphenyl-2,2-propane diglycidyl ether, resorcinol diglycidyl ether, bisphenol A diglycidyl ether, bisphenol F diglycidyl ether, polyethylene glycol diglycidyl ether, polypropylene glycol diglycidyl ether and polyglycol diglycidyl ether), triglycidyl ethers (including for example glycerol triglycidyl ether, trimethylolethane triglycidyl ether, trimethylol propane triglycidyl ether, triphenylolmethane triglycidyl, ether castor oil triglycidyl ether, propoxylated glycerin triglycidyl ether), tetraglycidyl ethers (including for example pentaerythritol tetraglycidyl ether and 1,1,2,2-tetrakis(hydroxyphenyl)ethane tetraglycidyl ether), polyglycidyl ethers (including for example sorbitol polyglycidyl ether and poly-phenol poly-glycidyl ether) and mixtures thereof; should the one or more glycidyl ethers have a viscosity not suitable for inkjet printing, the top coating composition described herein comprises said one or more glycidyl ethers in combination with one or more mono-glycidyl ethers and/or one or more diglycidyl ethers and/or one or more solvents to reduce the viscosity; wherein the one or more hybrid curable compounds are hydroxy modified or (meth)acrylate modified vinyl ethers, in particular VEEA, 2-(2-Vinyloxyethoxy)ethyl acrylate from Nippon Shokubai and methyl 2-((allyloxy)methyl)acrylate (AOMA™) from Nippon Shokubai;

wherein the one or more solvents are selected from the group consisting of alcohols (in particular ethanol), ketones (in particular cyclic ketones such as cyclopentanone and cyclohexanone), glycols, glycol ethers (in particular dipropylene glycol methyl ether), ether esters (in particular ethyl 3-ethoxypropionate), glycol ether esters (in particular propylene glycol methyl ether acetate), alkylene carbonates (in particular propylene carbonate) and mixtures thereof; and wherein the one or more radically curable compounds are selected from the group consisting of mono(meth)acrylates, di(meth)acrylates, tri(meth)acrylates such as those described herein, tetra(meth)acrylates such as those described herein and mixtures thereof and one or more free radical photoinitiators such as those described herein (in particular alpha-hydroxyketones such as those described herein), wherein suitable mono(meth)acrylates may be selected from the group consisting of alkyl (meth)acrylates, cycloalkyl (meth)acrylates (such as for example 3,3,5-trimethylcyclohexyl acrylate and isobornyl acrylate), benzyl (meth)acrylates, phenyl (meth)acrylates (including phenoxyalkyl (meth)acrylates such as phenoxyethyl acrylate), cyclic trimethylolpropane formal acrylate, tetrahydrofurfuryl acrylate, aliphatic urethane (meth)acrylates and alkoxylated (in particular ethoxylated or propoxylated) compounds thereof, and suitable di(meth)acrylates include ethylene glycol diacrylate, glycol dimethacrylate, butanediol di(meth)acrylate, 2-methyl-1,3-propanediol diacrylate, 3-methyl-1,5-pentanediol diacrylate, 2-butyl-2-ethyl-1,3-propanediol diacrylate, 1,6-hexanediol di(meth)acrylate, neopentyl glycol di(meth)acrylate, 1,9-nonanediol di(meth)acrylate, 1,10-decaanediol di(meth)acrylate, alkoxylated (in particular ethoxylated and propoxylated) 1,6-hexanediol diacrylates, propoxylated neopentyl glycol diacrylate, ethoxylated 2-methyl-1,3-propanediol diacrylate, tricyclodecanedimethanol diacrylate, diethylene glycol di(meth)acrylate, dipropylene glycol diacrylate, triethylene glycol di(meth)acrylate, tripropylene glycol di(meth)acrylate, tetraethylene glycol di(meth)acrylate and polyethylene glycol 200/400/600 di(meth)acrylates, and wherein the more free radical photoinitiators are selected from the group consisting of hydroxyketones (e.g. alpha-hydroxyketones), benzyl ketals, benzoin ethers, phosphine oxides, phenylglyoxylates and mixtures thereof, more preferably selected form the group consisting of phosphine oxides, hydroxyketones, phenylglyoxylates and mixtures thereof, still more preferably hydroxyketones (e.g. alpha-hydroxyketones).

Optionally, and with the aim of improving the curing efficiency of the UV-Vis radiation cationically curable inks described herein, the top coating composition described herein may further comprise one or more cationic photoinitiators.

According to one embodiment for UV-Vis radiation hybrid curable ink described herein, the top coating composition described herein may comprise one or more cationically curable compounds, one or more hybrid curable compounds, one or more solvents, one or more radically curable compounds or a mixture thereof;

wherein the one or more cationically curable compounds may be those described herein for the UV-Vis radiation curable ink described herein, preferably selected from the group consisting of vinyl ethers, propenyl ethers, cyclic ethers such as epoxides, glycidyl ethers, oxetanes, and tetrahydrofuranes, and mixtures thereof such as those described herein and more preferably selected from the group consisting of vinyl ethers, glycidyl ethers, oxetanes and mixtures thereof such as those described herein; wherein the one or more hybrid curable compounds are hydroxy modified or (meth) acrylate modified vinyl ethers, in particular VEEA, 2-(2-Vinyloxyethoxy)ethyl acrylate from Nippon Shokubai and methyl 2-((allyloxy)methyl)acrylate (AOMA™) from Nippon Shokubai;

wherein the one or more solvents are selected from the group consisting of alcohols (in particular ethanol), ketones (in particular cyclic ketones such as cyclopentanone and cyclohexanone), glycols, glycol ethers (in particular dipropylene glycol methyl ether), ether esters (in particular ethyl 3-ethoxypropionate), glycol ether esters (in particular propylene glycol methyl ether acetate), alkylene carbonates (in particular propylene carbonate) and mixtures thereof; and wherein the one or more radically curable compounds are selected from the group consisting of mono(meth) acrylates such as those described herein, di(meth)acrylates such as those described herein, tri(meth)acrylates such as those described herein, tetra(meth)acrylates such as those described herein and mixtures thereof.

Optionally, and with the aim of improving the curing efficiency of the UV-Vis radiation hybrid curable ink described herein, the top coating composition described herein may further comprise one or more cationic photoinitiators and/or one or more free radical photoinitiators such as those described herein.

For embodiments wherein the top coating composition is applied by an inkjet printing process, said top coating composition may further comprises conventional additives and ingredients such as for example reactive diluents, wetting agents, antifoams, surfactants and mixtures thereof that are used in the field of radiation curable inkjet.

The method described herein further comprises subsequently to the step b), the step c) of curing the coating layer (x10) and the one or more indicia (x30) described herein with the one or more curing units (x50) described herein. Preferably, the curing step c) described herein is carried out with one or more curing units (x50) (also referred in the art as light sources) selected from the group consisting of mercury lamps (preferably medium-pressure mercury lamps), UV-LED lamps and sequences thereof. Typical sequences include the use of one or more UV-LED lamps in a first step to at least partially cure the UV-Vis radiation ink and the one or more indicia (x30) and one or more medium-pressure mercury lamps in a second step. Mercury lamps advantageously emit on a wide range of wavelengths in the UV-A, UV-B and UV-C range. Accordingly, there is a large selection of photoinitiators or combinations of photoinitiator/photosensitizer having an absorption spectrum matching at least one of the emission band of the mercury lamp. UV-LED have a more limited range of wavelengths, such that only a limited selection of photoinitiators or combination of photoinitiator/photosensitizer is efficient enough at industrial printing speed. On the other hand, UV-LEDs are less costly, require less energy (in particular, they need much less demanding heat dissipation systems), are not prone to ozone formation and have a much longer lifespan.

The time between the step b) described herein and the step c) described herein is less than 5 seconds, preferably less than about 4 seconds, more preferably equal to about 3.5 or less than about 3.5 seconds.

The present invention provides the methods described herein to produce security features exhibiting one or more indicia (x30) on the substrates (x20) described herein and substrates (x20) comprising one or more security features obtained thereof and security features exhibiting the one or more indicia (x30) described herein and produced by the methods described herein. The shape of the security features described herein may be continuous or discontinuous. According to one embodiment, the shape of the coating layer (x10) represent one or more indicia, dots and/or lines, wherein said indicia may have the same shape as the one or more indicia (x30) made of the top coating composition described herein or may have a different shape.

Preferably, the UV-Vis radiation curable ink described herein is applied on a transparent or partially transparent region of the substrate by the methods described therein. As used herein, "a transparent or partially transparent region of a substrate" refers to a region of the substrate, wherein said region is characterized by an average transmittance in the visible range of at least 50%, preferably of at least 70%, more preferably of at least 90%. The transparent or partially transparent region of the substrate and the remaining region of the substrate may be made either of the same material, or of different materials. Elimination of one or more layers in a multilayer structure or application of a transparent or partially transparent material to an aperture in a substrate made of a material, which is different from the transparent or partially transparent material provides value documents substrates, wherein the transparent or partially transparent region of the substrate and the remaining region of the substrate are made of different materials.

Materials for value document or value article substrates include without limitation, papers or other fibrous materials such as cellulose, paper-containing materials, plastics and polymers, composite materials, and mixtures or combinations thereof. Typical paper, paper-like or other fibrous materials are made from a variety of fibers including without limitation abaca, cotton, linen, wood pulp, and blends thereof. As well known to those skilled in the art, cotton and cotton/linen blends are preferred for banknotes, while wood pulp is commonly used in non-banknote security documents. Typical examples of plastics and polymers include polystyrene, polycarbonate, polyolefins, such as polyethylene (PE) and polypropylene (PP) including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly(ethylene 2,6-naphthoate) (PEN), and polyvinylchlorides (PVC). Typical examples of composite materials include without limitation multilayer structures or laminates of paper and at least one plastic or polymer material, such as those described hereabove. Suitable materials for the transparent or partially transparent region of the substrate include, but are not limited to polystyrene, polycarbonate, polyolefins, such as polyethylene (PE) and polypropylene (PP) including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly (ethylene 2,6-naphthoate) (PEN), and polyvinylchlorides (PVC). The transparent or partially transparent region of the substrate of the value document may carry a primer layer on the top of which the UV-Vis radiation curable ink is printed. The primer layer may be obtained by UV-Vis curing a varnish containing all the ingredients of the UV-Vis radiation curable ink described herein, with the exception of the silver nanoplatelets.

Also described herein are methods of manufacturing a value document, a value article or a decorative element or object comprising a) providing a value document, value article or a decorative element or object, and b) providing the one or more security features described herein, in particular such as those obtained by the method described herein, so that it is comprised by the value document, value article or decorative element or object.

The present invention further provides value documents and value articles comprising the security feature described herein or value documents and value articles comprising more than one of the security features described herein. The present invention further provides value documents and value articles comprising the substrate described herein and the security feature described herein or value documents and value articles comprising more than one of the security features described herein.

Preferably, the value document is selected from banknotes, deeds, tickets, checks, vouchers, fiscal stamps, agreements, identity documents such as passports, identity cards, visas, driving licenses, bank cards, credit cards, transactions cards, access documents, and cards, entrance tickets, public transportation tickets, academic diploma, and academic titles. More preferably the value document is a banknote. The UV-Vis radiation curable ink described herein may be also used for producing a security feature directly on a value article including value commercial goods. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Alternatively, the security features described herein may be produced onto an auxiliary substrate such as for example a security thread, security stripe, a foil, a decal, a window or a label and consequently transferred to a value document or value article in a separate step.

With the aim of further increasing the security level and the resistance against counterfeiting and illegal reproduction of value documents and value articles, the substrate described herein may contain printed, coated, or laser-marked or laser-perforated indicia, watermarks, security threads, fibers, planchettes, luminescent compounds, windows, foils, decals, primers and combinations of two or more thereof.

With the aim of increasing the durability through soiling or chemical resistance and cleanliness and thus the circulation lifetime of value documents and value articles or with the aim of modifying their aesthetical appearance (e.g. optical gloss), one or more protective layers may be applied on top of the security features or value document or value article described herein. When present, the one or more protective layers are typically made of protective varnishes which may be transparent or slightly colored or tinted and may be more or less glossy, Protective varnishes may be radiation curable compositions, thermal drying compositions or any combinations thereof. Preferably, the one or more protective layers are made of radiation curable, ore preferably UV-Vis radiation curable compositions. Suitable composition for the one or more protective layers are described in WO 2020/234211A1, WO 2013/127715A2 and WO 2014/067715A1.

The security features exhibiting one or more indicia (x30) described herein may be provided directly on a substrate on which it shall remain permanently (such as for banknote applications). Alternatively, a security feature may also be provided on a temporary substrate for production purposes, from which the security feature is subsequently removed, Thereafter, after hardening/curing of the UV-Vis radiation curable inks described herein for the production of the security feature, the temporary substrate may be removed from the security feature.

Alternatively, in another embodiment an adhesive layer may be present on the security feature or may be present on the substrate comprising said security feature, said adhesive layer being on the side of the substrate opposite to the side where the security feature is provided or on the same side as the security feature and on top of the security feature. Therefore, an adhesive layer may be applied to the security feature or to the substrate, said adhesive layer being applied after the curing step has been completed. Such an article may be attached to all kinds of documents or other articles or items without printing or other processes involving machinery and rather high effort. Alternatively, the substrate described herein comprising the security feature described herein may be in the form of a transfer foil, which can be applied to a document or to an article in a separate transfer step. For this purpose, the substrate is provided with a release coating, on which the security feature is produced as described herein. One or more adhesive layers may be applied over the so produced security feature.

Also described herein are substrates, value documents, values articles including value commercial goods, decorative elements and objects comprising more than one, i.e. two, three, four, etc. security feature described herein. Also described herein are articles, in particular value documents, values articles including value commercial goods, decorative elements or objects, comprising the security feature described herein.

As mentioned hereabove, the security features described herein may be used for protecting and authenticating value documents and values articles including value commercial goods.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

The present invention is now described in more details with reference to non-limiting examples.

The Examples below provide more details for the preparation of security features obtained by applying top coating inkjet inks (IJ1-IJ14) in the shape of one or more indicia (x30) on coating layers (x10) made of UV-Vis radiation cationically or hybrid curable screen inks comprising silver nanoplatelets (SP1-SP10) and curing said one or more indicia (x30) and said coating layer (x10) with a curing unit (x50).

Tables 1A and 1B provides a description of the used UV-Vis radiation cationically or hybrid curable screen printing inks.

Tables 2A and 2B provide a description of the top coating inkjet inks (IJ1-IJ14) to be applied on the coating layer (x10) made of the screen printing inks in the shape of one or more indicia (x30).

Tables 3A-H provide the optical properties of security features obtained by the method of the invention (Examples E1-E48) and comparative methods (C1-C8), wherein the top coating inkjet ink was applied at different ink deposit values (g/m$^2$).

Tables 4A-B provide the optical properties of security features obtained by the process of the invention (Examples E49-E68), wherein the composition of the UV-Vis radiation cationically or hybrid curable screen printing inks was modified.

Tables 5A-B provide the optical properties of security features obtained by the method of the invention (Examples E69-E83), wherein the composition of the top coating inkjet inks was modified.

Tables 6A-B provide the optical properties of security features obtained by the method of the invention (Examples E84-E91) and comparative methods (C9-C28), when the time between the application of the top coating inkjet ink in the shape of the one or more indicia (x30) partially on top of the coating layer (x10) and the curing of said one or more indicia (x30) and said coating layer (x1) was modified.

Analytical Methods

A-1. UV-Vis Spectroscopy

UV-Vis spectra of dispersions were recorded on Varian Cary 50 UV-Visible spectrophotometer at such concentration of dispersions as to achieve the optical density of 0.3 to 1.5 at 1 cm optical path.

A-2. TEM Analysis

TEM analysis was conducted on dispersions containing silver nanoplatelets in isopropanol using an EM 910 instrument from ZEISS, INST.109, in bright field mode at an e-beam acceleration voltage of 100 kV. At least 2 representative images with scale in different magnification (5.00×, 10.000λ and 20.000λ) were recorded in order to characterize the dominant particle morphology for each sample. The number mean diameter of the particles was determined from TEM images as maximum dimension of nanoplatelets, oriented parallel to the plane of the image, using the image analysis software (Thorsten Wagner ij-particlesizer v. 1.0.9; DOI: 10.5281/zenodo.820296), based on the measurement of at least 500 randomly, selected particles. The number mean thickness of the particles was measured manually as the maximum dimension of nanoplatelets, oriented perpendicular to the plane of the image, from a TEM image, based on the measurement of at least 300 randomly selected particles.

In particular, a part of the dispersion was transferred to a smooth foil. After drying, the sample was embedded in Araldit®, which was cross-linked below 60° C. Ultrathin cross-sections of the embedded sample were prepared perpendicular to the foil surface. The thickness of at least 300 randomly selected silver nanoplatelets were determined from the cross-sectional TEM images (recorded at magnification 25.000λ) by fitting ellipses to the cross-sectioned particles by the software (ParticleSizer). The minor axis (the shortest diameter) of the fitted ellipse was taken as particle thickness.

Preparation and Characterization of Silver Nanoplatelets Dispersions D1 and D2

B-1. Synthesis of Raw Material

In a 1 L double-wall glass reactor equipped with anchorstirrer, 365 g of de-ionized water was cooled to +2° C. 13.62 g of sodium borohydride was added and the mixture was cooled to −1° C. with stirring at 250 rounds per minute (RPM, Solution A).

In a 0.5 L double-wall glass reactor equipped with anchorstirrer, 132 g of deionized water and 4.8 g of MPEG-5000-thiol were combined and the mixture was stirred for 10 minutes at room temperature. 72 g of the product of Example A3 of WO 2006/074969A1 was added and the resulting mixture was stirred for another 10 minutes at room temperature for homogenization. The solution of 30.6 g of silver nitrate in 30 g of de-ionized water was added in one portion and the mixture was stirred for 10 minutes, resulting in an orange-brown viscous solution. To this solution 96 g of deionized water was added, followed by addition of 3 g of Struktol SB 2080 defoamer, pre-dispersed in 36 g of deionized water. The resulting mixture was cooled to 0° C. with stirring at 250 RPM (Solution B).

Subsequently, Solution B was dosed with a peristaltic pump at a constant rate over 2 h into Solution A under the liquid surface via a cooled (0° C.) dosing tube, resulting in spherical silver nanoplatelets dispersion. During pumping, the Solution A was stirred at 250 RPM.

After dosing was complete, the reaction mixture was warmed up to +5° C. within 15 minutes and a solution of 862 mg of KCl in 10 g of deionized water was added in one portion, followed by addition of 9.6 g of ethylenediaminetetraacetic acid (EDTA) in 4 equal portions with 10 minutes time intervals.

After addition of the last EDTA portion, the reaction mixture was stirred for 15 minutes at +5° C., then warmed up to 35° C. over 30 minutes and stirred for 1 h at this temperature. Upon this time, hydrogen evolution is completed.

3.0 mL of 30% w/w solution of ammonia in water was added, followed by addition of 5.76 g of solid NaOH and the mixture was stirred for 15 min at 35° 0. Then 180 mL of 50% w/w hydrogen peroxide solution in water were dosed with a peristaltic pump at a constant rate over 4 h into the reaction mixture under the liquid surface with stirring at 250 RPM, while maintaining the temperature at 35° C. This has led to a deep blue colored dispersion of silver nanoplatelets, which was cooled to room temperature. 1.23 g of compound of formula (mixture of CAS 80584-88-9 and 80584-89-0) was added, and the mixture was stirred for 1 h at room temperature.

B-2. Isolation and Purification of Ag Nanoplatelets

B-2a. First Decantation 9.6 g of sodium dodecylsulfate was added to the reaction mixture and then ca. 25 g of anhydrous sodium sulfate powder was added in portions with stirring until the transmission color of the dispersion changed from blue to pink. Then the mixture was kept without stirring at room temperature for 24 h, allowing the coagulated nanoplatelets to sediment at the bottom of the reactor.

890 g of supernatant was pumped out from the reactor with a peristaltic pump, and 890 g of deionized water was added to the reactor. The mixture in reactor was stirred for 1 h at room temperature, allowing the coagulated particles to re-disperse.

B-2b. Second Decantation

Ca. 64 g of anhydrous sodium sulfate powder was added in portions with stirring until the transmission color of the dispersion changed from blue to yellowish-pink. Then the mixture was kept without stirring at room temperature for 12 h, allowing the coagulated nanoplatelets to sediment at the bottom of the reactor. 990 g of supernatant was pumped out from the reactor with a peristaltic pump, and 90 g of deionized water was added to the reactor. The resulting mixture was stirred for 30 minutes at room temperature, allowing the coagulated particles to re-disperse.

B-2c. Ultrafiltration in Water

The resulting dispersion of Ag nanoplatelets was subjected to ultrafiltration using a Millipore Amicon 8400 stirred ultrafiltration cell. The dispersion was diluted to 400 g weight with de-ionized water and ultrafiltered to the end volume of ca. 50 mL using a polyethersulfone (PES) membrane with 300 kDa cut-off value. The procedure was repeated in total 4 times to provide 60 g of Ag nanoplatelets dispersion in water. After ultrafiltration was completed, 0.17 g of compound of formula (mixture of CAS 80584-88-9 and 80584-89-0) was added to the dispersion.

Ag content 28.9% w/w; yield ca. 89% based on total silver amount; Solids content (at 250° C.) 33.5% w/w; Purity 86% w/w of silver based on solids content at 250° C.

B-2d. Ultrafiltration in Isopropanol

The dispersion was further ultrafiltered in isopropanol. 60 g of Ag nanoplatelets dispersion, obtained after ultrafiltration in water, was placed in a Millipore Amicon 8400 stirred ultrafiltration cell and diluted to 300 g weight with isopropanol. The dispersion was ultrafiltered to the volume of ca. 50 mL using a polyethersulfone (PES) membrane with 500 kDa cut-off value. The procedure was repeated in total 4 times to provide 72 g of Ag nanoplatelets dispersion in isopropanol.

Ag content 24.1% w/w; Solids content (at 250° C.) 25.7% w/w; Purity 93.5% w/w of silver based on solids content at 250° C.

The UV-Vis-NIR spectrum was recorded in water at Ag concentration of $9.8*10^{-5}$ M. $\lambda_{max}$=700 nm; extinction coefficient at maximum E=10200 L/(cm*mol Ag), FWHM=340 nm.

Number mean particle diameter 93±40 nm, number mean particle thickness 16±2.5 nm.

B-3. Preparation of Dispersion D1 a) Surface Modification of Ag Nanoplatelets 50 g (12.85 g solids) of the Ag nanoplatelets dispersion obtained as described at item B-2d was placed in a 250 mL round-bottom flask under argon atmosphere at 23° C. 2.05 g of 5% w/w solution of carbon disulfide in absolute ethanol was added and the mixture was stirred for 5 min, followed by addition of 2.77 g of 5% w/w solution of diethanolamine in absolute ethanol. The mixture was stirred for 1 h at 23° C., then 2.77 g of 5% w/w solution of diethanolamine in absolute ethanol was added and stirring was continued for 30 min.

The UV-Vis-NIR spectrum was recorded in water at Ag concentration of $9.8*10^{-5}$ M. $\lambda_{max}$=704 nm.

b) Solvent Switch

To the dispersion obtained in step a), 15.0 g of ethyl 3-ethoxypropionate was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 41.2% w/w).

B-4 Preparation of Dispersion D2 a) Surface Modification of Ag Nanoplatelets 50 g (12.85 g solids) of the Ag nanoplatelets dispersion obtained as described at item B-2d was placed in a 250 mL round-bottom flask under argon atmosphere at 23° C. 2.05 g of 5% w/w solution of carbon disulfide in absolute ethanol was added and the mixture was stirred for 5 min, followed by addition of 2.77 g of 5% w/w solution of diethanolamine in absolute ethanol. The mixture was stirred for 1 h at 23° C., then 2.77 g of 5% w/w solution of diethanolamine in absolute ethanol was added and stirring was continued for 30 min.

The UV-Vis-NIR spectrum was recorded in water at Ag concentration of $9.8*10^{-5}$ M. $\lambda_{max}$=704 nm b) Solvent Switch To the dispersion, obtained in step a), 15.0 g of 7-oxabicyclo[4.1.0]hept-3-ylmethyl 7-oxabicyclo[4.1.0]heptane-3-carboxylate (CAS: 2386-87-0) was added. The resulting mixture was concentrated on rotary evaporator at 40 mbar pressure and 40° C. bath temperature, till no more solvent was distilled off. The weight of the resulting dispersion was adjusted to 32.1 g by addition of 7-oxabicyclo[4.1.0]hept-3-ylmethyl 7-oxabicyclo[4.1.0]heptane-3-carboxylate (CAS: 2386-87-0) (corresponds to the calculated total solids content of 41.2% w/w).

C. Preparation of the UV-Vis radiation curable screen printing inks (SP1-SP10) and the top coating inkjet inks (IJ1-IJ14)

C1. UV-Vis Radiation Cationically or Hybrid Curable Screen Printing Inks (SP1-SP10)

TABLE 1A

Ingredients of the UV-Vis radiation curable screen printing inks (not including the Ag nanoplatelets)

| Ingredients | Commercial name (supplier) | Chemical composition (CAS number) |
|---|---|---|
| Polyvinylchloride copolymer | Vinnol ® H14/36 (Wacker) | 85.6 wt-% PVC + 14.4 wt-% PVAc (9003-22-9) |
| Cycloaliphatic epoxide | Uvacure ® 1500 (Allnex) | 7-oxabicyclo[4.1.0]hept-3-ylmethyl 7-oxabicyclo[4.1.0]heptane-3-carboxylate (2386-87-0) |
| Vinylether | DVE-3 (BASF) | triethylenegylcol divinylether (765-12-8) |
| Oxetane | Curalite ™ OxPlus (Perstorp) | bis ([1-ethyl(3-oxetanyl)]methyl) ether (18934-00-4) |
| Epoxide | Grilonit ® V51-63 (EMS Griltech) | cyclohexane dimethanol diglycidylether (14228-73-0) |
| Acrylate oligomer | Ebecryl ® 2959 (Allnex) | 23 wt-% Glycerol, propoxylated, esters with acrylic acid (52408-84-1) + 77 wt-% 4,4'-Isopropylidenediphenol, oligomeric reaction products with 1-chloro-2,3-epoxypropane, esters with acrylic acid (55818-57-0) |
| Acrylate monomer | TMPTA (Allnex) | 2,2-bis(acryloyloxymethyl)butyl acrylate (15625-89-5) |
| Perfluoropolyether reactive surfactant | Fluorolink ® E10H (Solvay) | tetrafluoroethylene, oxidized, oligomers, reduced, methyl esters, reduced, reaction products with ethylene oxide (162492-15-1)<br>Average molecular weight 1700 [g/mol] |
| Photoinitiator | Omnicat 250 (IGM Resins) | 75% iodonium, (4-methylphenyl)[4-(2-methylpropyl)phenyl]-, hexafluorophosphate(1-) (1:1) (344562-80-7) + 25% propylene carbonate (108-32-7) |
| Photoinitiator | SpeedCure 976 (Arkema (previously Lambson)) | 50 wt-% mixture of sulfonium, diphenyl[4-(phenylthio) phenyl]-, (OC-6-11)-hexafluoroantimonate(1-) (1:1) + sulfonium, (thiodi-4,1-phenylene)bis[diphenyl-, (OC-6-11)-hexafluoroantimonate(1-) (1:2) (71449-78-0 and 89452-37-9) in 50% propylene carbonate (108-32-7) |
| Photoinitiator | Omnirad 2100 (IGM Resins) | 92.5% ethyl phenyl(2,4,6-trimethylbenzoyl)phosphinate + 7.5 wt-% phenyl bis(2,4,6-trimethylbenzoyl)-phosphine oxide (448-61-3) |
| Photosensitizer | SpeedCure CPTX (Arkema (previously Lambson)) | 1-chloro-4-(n-propoxy)-5-thioxanthen-10-one (142770-42-1) |
| Photosensitizer | ANTHRACURE ® UVS 1331 (Kawasaki Kasei) | 9,10-dibutoxyanthracene (76275-14-4) |
| Solvent | UCAR ESTER EEP (Brenntag) | ethyl 3-ethoxypropionate (763-69-9) |

TABLE 1B

Composition (in wt-%) of the UV-Vis radiation cationically (SP1-SP5) or hybrid (SP6-SP10) curable screen printing inks (SP1-SP10)

| Ingredients | SP1 | SP2 | SP3 | SP4 | SP5 | SP6 | SP7 | SP8 | SP9 | SP10 |
|---|---|---|---|---|---|---|---|---|---|---|
| Vinnol ® H14/36 | 6.9 | 6.9 | 6.9 | 6.9 | 6.9 | 7.4 | 7.4 | 7.4 | 7.4 | 7.4 |
| Uvacure ® 1500 | 49 | 49 | 54.5 | 37.7 | 37.7 | 43.7 | 31.7 | 37.2 | 20.4 | 20.4 |
| DVE-3 | 16.8 | | | 16.8 | | 4.8 | | | 16.8 | |
| Curalite ™ OxPlus | | 16.8 | | | | | 16.8 | | | |
| Grilonit ® V51-63 | | | | | 16.8 | | | | | 16.8 |
| Ebecryl ® 2959 | | | | | | 4.1 | 4.1 | 4.1 | 4.1 | 4.1 |
| TMPTA | | | | | | 8.7 | 8.7 | 8.7 | 8.7 | 8.7 |
| Fluorolink ® E10H | 1.8 | 1.8 | 1.8 | 1.8 | 1.8 | 1.8 | 1.8 | 1.8 | 1.8 | 1.8 |
| Omnicat 250 | 5 | 5 | 5 | 5 | 5 | | | | | |
| SpeedCure 976 | | | | | | 5.8 | 5.8 | 5.8 | 5.8 | 5.8 |
| Omnirad 2100 | | | | | | 3.2 | 3.2 | 3.2 | 3.2 | 3.2 |
| SpeedCure CPTX | 0.5 | 0.5 | 0.5 | 0.5 | 0.5 | | | | | |
| ANTHRACURE ® UVS 1331 | | | | | | 0.5 | 0.5 | 0.5 | 0.5 | 0.5 |
| UCAR ESTER EEP | | | 11.3 | 11.3 | 11.3 | | | 11.3 | 11.3 | 11.3 |
| Dispersion D1[a)] | | | 20 | 20 | 20 | | | 20 | 20 | 20 |
| Dispersion D2[b)] | 20 | 20 | | | | 20 | 20 | | | |

[a)]41.2 wt-% Ag nanoplatelets stabilized with 3 wt-% diethanolammonium dihydroxyethyldithiocarbamate in ethyl-3-ethoxypropionate (CAS number 763-69-9)
[b)]41.2 wt-% Ag nanoplatelets stabilized with 3 wt-% diethanolammonium dihydroxyethyldithiocarbamate in triethylenegylcol divinylether (BASF DVE-3, CAS number 765-12-8)

All ingredients except the dispersions D1/D2 described in Table 1B were mixed and dispersed at room temperature using a Dispermat (model CV-3) for 10 minutes at 2000 rpm so as to obtain 20 g3 of each composition.

20 wt-% of the dispersion (D1/D2) were independently added to 80 wt-% of the respective composition and dispersed at room temperature using a Dispermat (model CV-3) for 5 minutes at 800-1000 rpm so as to obtain 5 g of each of the UV-Vis radiation cationically or hybrid curable screen printing inks (SP1-SP10).

C2. Top Coating Ink Let Inks (IJ1-IJ14)

Preparation and Evaluation of Security Features

D1. Preparation of the Security Features (E1-E91 and C1-C28)

Step a): the UV-Vis radiation curable screen printing inks SP1-SP10 described in Table 1B were independently applied by hand on a piece of a transparent window of a polymer substrate (x20) (Guardian, thickness 75 μm, supplied by CCL Secure, having a dimension of 60 mm×60 mm) using a 160 threads/cm screen so as at obtain coating layers (x10) having a thickness of 7-10 μm and forming a square with the following dimensions: 50 mm×50 mm.

TABLE 2A

Ingredients of the top coating inkjet inks (IJ1-IJ14)

| Ingredients | Commercial name (supplier) | Chemical name (CAS number) |
|---|---|---|
| Glycidyl ether | Araldite ® DY-E (Hunstmann) | C12-C14 monoglycidyl ether(68609-97-2) |
| Cycloaliphatic epoxide | Uvacure ® 1500 (Allnex) | 3,4-epoxycyclohexylmethyl-3,4-epoxycyclohexanecarboxylate (2386-87-0) |
| Vinyl ether | DVE-3 (BASF) | triethylene glycol divinyl ether (765-12-8) |
| Oxetane | Curalite ™ Ox (Perstorp) | 3-ethyloxetane-3-methanol (3047-32-3) |
| Oxetane | UviCure S140 (Arkema (previously Lambson)) | 3-ethyl-3-[(phenylmethoxy)methyl]-oxetane (18933-99-8) |
| Modified vinyl ether | VEEA (Nippon Shokubai) | 2-(2-vinyloxyethoxy)ethyl acrylate (86273-46-3) |
| Monoacrylate | GENOMER 1120 (Rahn) | 3,3,5-trimethylcyclohexyl acrylate (86178-38-3) |
| Diacrylate | SR341 (Sartomer) | 3-methyl-1,5-pentanediyl diacrylate (64194-22-5) |
| Diacrylate | MIRAMER M282 (Rahn) | poly(oxy-1,2-ethanediyl), α-(1-oxo-2-propen-1-yl)-ω-[(1-oxo-2-propen-1-yl)oxy]- (26570-48-9) |
| Triacrylate | MIRAMER M3190 (Rahn) | ethoxylated (EO3) trimethylolpropane triacrylate (28961-43-5) |
| Tetraacrylate | MIRAMER M4004 (Rahn) | ethoxylated pentaerythritol tetraacrylates (51728-26-8) |
| Solvent | UCAR ESTER EEP (Brenntag-Schweizerhalle) | ethyl 3-ethoxypropionate (763-69-9) |
| Solvent | propylene carbonate (Brenntag-Schweizerhalle) | propylene carbonate (108-32-7) |
| Solvent | ethanol (Brenntag-Schweizerhalle) | ethanol (64-17-5) |
| Photoinitiator | Omnirad 1173 (IGM) | 2-hydroxy-2-methylpropiophenone (7473-98-5) |

TABLE 2B

Top coating inkjet inks (IJ1-IJ14)

| | Composition | Viscosity [mPas] |
|---|---|---|
| IJ1 | DVE-3 | 4 |
| IJ2 | UviCure S140 | 8 |
| IJ3 | Curalite ™ OX | 13 |
| IJ4 | Araldite ® DY-E | 4 |
| IJ5 | 25 wt-% Uvacure ® 1500 + 75 wt-% DVE-3 | 6 |
| IJ6 | SR341 | 6 |
| IJ7 | 97 wt-% SR341 + 3 wt-% Omnirad 1173 | 6 |
| IJ8 | GENOMER 1120 | 5 |
| IJ9 | 60 wt-% GENOMER 1120 + 40 wt-% MIRAMER M4004 | 11 |
| IJ10 | 60 wt-% GENOMER 1120 + 40 wt-% MIRAMER M3190 | 13 |
| IJ11 | VEEA | 4 |
| IJ12 | ethanol | 4 |
| IJ13 | ethyl 3-ethoxypropionate | 1 |
| IJ14 | propylene carbonate | 3 |

The top coating inkjet inks comprising more than one ingredients (IJ5, IJ7, IJ9 and IJ10) were independently prepared by mixing the ingredients for 10 minutes at room temperature and at 1000 rpm using a Dispermat CV-3. The viscosity of the top coating inkjet inks was determined at 1000 s$^{-1}$ and 25° C. using a rotational viscosimeter DHR-2 (TA Instruments) having a cone-plane geometry and a diameter of 40 mm.

Subsequently to step a), step b): the top coating inkjet inks IJ1-IJ14 described in Table 2B were independently applied by a DOD (drop-on-demand) inkjet printing process using a KM1024i inkjet head (Konica Minolta, 360 dpi)) on the coating layers (x10) obtained in step a) so as to obtain one or more indicia (x30) having the shape of a square with the following dimension: 30 mm×30 mm, said indicia (x30) being centered on the square formed by the coating layers (x10) obtained in step a).

Subsequently to step b), step c): the coating layers (x10) obtained after step a) and the inkjet printed indicia (x30) obtained after step b) were simultaneously cured by exposure to a curing unit (x50) being a UV-LED lamp from OmniCure® (Type AC4 50×25 mm, 385 nm, 8 W/cm$^2$) for about 0.5 second.

This method allowed the production of security features according to comparative methods (C1-C28) and security features according to the method of the invention (E1-E91), wherein each security feature comprised a first area made of the cured coated layer (x10) lacking the one or more cured inkjet printed indicia (x30) and a second area made of the combination of the cured coating layer (x10) and the one or more cured inkjet printed indicia x30), i.e. the first area corresponds to a surrounding zone having a width of about 10 mm of the security feature while the second area corresponds to the central zone with the following dimension: 30 mm×30 mm.

The determination of the ink deposit of the one or more indicia (x30) made of the top coating inkjet ink applied on the coating layer (x10) was carried out using a linear regression method. Four inkjet ink deposits were experimentally measured (points 1-4 in FIG. 3B) and a linear regression line with a 0-intercept was established on the basis of these experimentally obtained inkjet ink deposits. The inkjet ink deposits in g/m$^2$ for all examples and comparative examples were calculated from the linear function. The procedure was the following one:

i) the following parameters were introduced in the software driving the Konica Minolta inkjet printhead described hereabove: resolution of 360 dpi; dpd (drops per dots): 1 for point 1, 3 for point 2, 5 for point 3 and 7 for point 4; grey level: 100%; printed shape: full black square of 30 mm×30 mm;

ii) the UV-Vis radiation cationically curable screen printing ink SP1 (Table 1B) was independently applied on the substrates (x20) (size=70 mm×70 mm) as described above in step a) to produce coating layers (x10) (size=30 mm×30 mm), each substrate (x20) comprising the coating layer (x10) was then independently weighted using an analytical balance (Mettler Toledo XS64). Four sets (i.e. one set for each point 1 to 4) of three samples were prepared and an average value was calculated for each set (x10+x20).

Figures 3A, 3B:
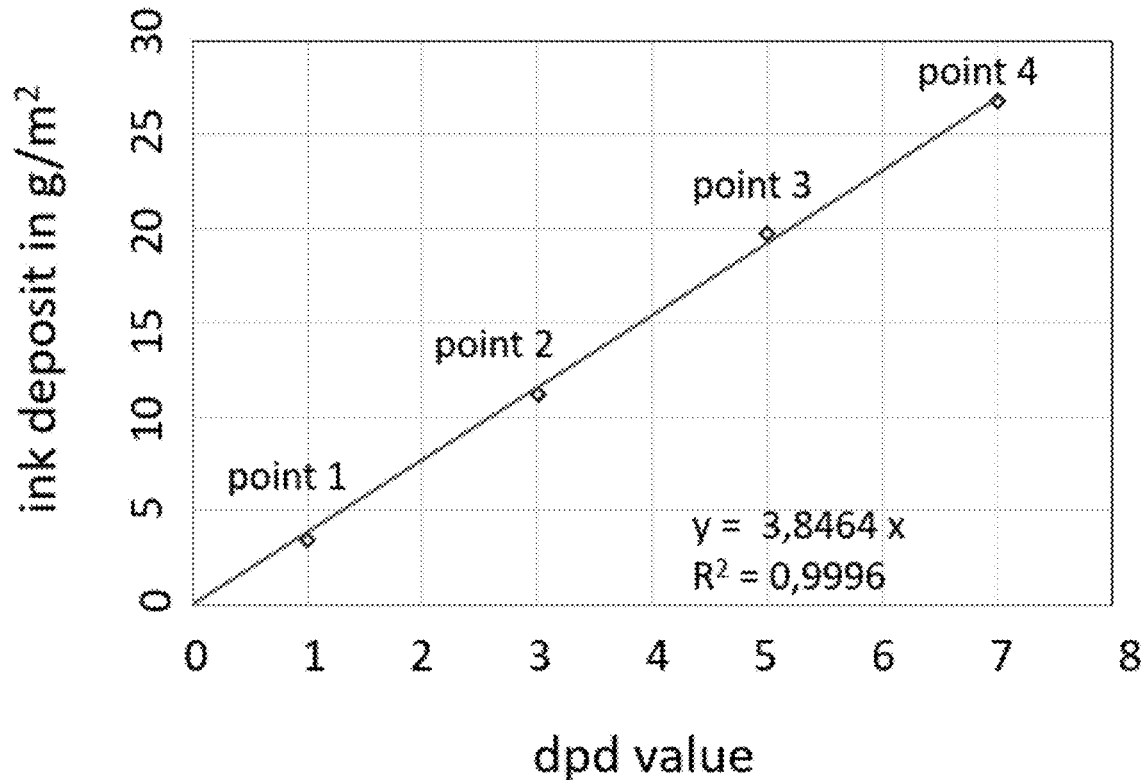
FIG. 3A shows a table with the top coating inkjet ink deposits as experimentally determined and calculated and FIG. 3B illustrates the linear regression line obtained from inkjet ink deposits in g/m² (measured by weight) versus top coating ink deposit in dpd (drops per dot) as well as the linear function and the R²-value.

Average values are provided in FIG. 3A;

iii) the top coating inkjet ink IJ11 (Table 2B) was applied at 35° C. in the shape of the one or more indicia (x30) described hereabove (square with dimension of 30 mm×30 mm) with an image grey level of 100% on top of the coating layers (x10) obtained under ii) with four different dpd values 1, 3, 5 and 7 (generating points 1, 2, 3 and 4, respectively and shown in FIG. 3B); each substrate (x20) comprising said coating layer (x1S) and said one or more indicia (x30) was then weighted using the same analytical balance as described hereabove. Average value of three samples were calculated for each set (x10+x20+x30) and are provided in FIG. 3A;

iv) the average value of the top coating inkjet ink deposit (x30) was calculated by subtracting from the average weight under iii) (i.e. the average weight of (x10+x20+x30) the average weight obtained under i') (x10+x20); and v) for each set corresponding to points 1, 2, 3 and 4 (FIG. 3A) sample, the inkjet ink deposit in [g/m$^2$] was obtained by dividing the average inkjet ink deposit obtained under iv) by the known printed area (30×30 mm, or 0.000900 m$^2$).

vi) A linear regression line with a 0-intercept (FIG. 3B) was established with the dpd values on the x-axis and the inkjet ink deposits obtained under v) on the y-axis. The slope of the so-obtained linear function was 3.8464 and the R$^2$-value was 0.9996. The graph displayed in FIG. 3B discloses as a scatter plot the values obtained from the weight measurements (between 1 and 7 dpd), the linear regression line corresponding to:

$$\text{weighted ink deposit in } [g/m^2] = f(dpd \text{ value})$$

with the so-obtained linear function and the R$^2$-value shown in Fib. 3B, i.e. weighted ink deposit in [g/m$^2$]=3.8464*dpd value with R$^2$ being 0.9996. The Table shown in FIG. 3A discloses the numerical values (weight measurements) and the values calculated from the linear function (last column).

The ink deposits (in g/m$^2$) for all examples and comparative examples were calculated from the provided linear function. For ink deposits corresponding to a (theoretical) dpd value less than 1, the grey level (in %) of the inkjet printed image a mentioned under i) was reduced. The dpd values, the image grey levels in % of the printed images and the calculated ink deposits in g/m$^2$ are reported in the Tables.

The method described hereabove under steps a)-c) was used to prepare the examples according to a comparative method C1-C4 and the Examples according to the method of the invention E1-E28, wherein the UV-Vis cationically curable screen printing ink SP4 (Table 1B) was used in step a), the inkjet inks IJ11, IJ1, IJ12 and IJ7 (Table 2B) were used in step b), the time between step b) and step c) was fixed at about 0.5 seconds and the inkjet ink deposits was varied between about 0.4 g/m$^2$ and about 26.9 g/m$^2$, the optical results of the obtained security features are reported in Tables 3A-D;

the examples according to a comparative method C5-C8 and Examples according to the method of the invention E29-E48, wherein the UV-Vis hybrid curable screen printing ink SP9 (Table 1B) was used in step a), the inkjet inks IJ11, IJ1, IJ12 and IJ6 (Table 2B) were used in step b), the time between step b) and step c) was fixed at about 0.5 seconds and the inkjet ink deposits was varied between about 0.4 g/m$^2$ and about 11.5 g/m$^2$, the optical results of the obtained security features are reported in Table 3E-3H; a the Examples according to the method of the invention E49-E58, wherein the UV-Vis cationically curable screen printing inks SP1-SP5 (Table 1 B) were used in step a), the inkjet ink IJ11 (Table 2B) was used in step b), the time between step b) and step c) was fixed at about 0.5 seconds and the inkjet ink deposits were either about 1.0 g/m$^2$ or about 11.5 g/m$^2$, the optical results of the obtained security features are reported in Table 4A;

a the Examples according to the method of the invention E59-E68, wherein the UV-Vis hybrid curable screen printing inks SP6-SP10 (Table 1 B) were used in step a), the inkjet ink IJ11 (Table 2B) was used in step b), the time between step b) and step c) was fixed at about 0.5 seconds and the inkjet ink deposits were either about 1.0 g/m$^2$ or about 11.5 g/m$^2$, the optical results of the obtained security features are reported in Table 4B;

the Examples according to the method of the invention E69-E74, wherein the UV-Vis cationically curable screen printing ink SP4 (Table 1B) was used in step a), the inkjet inks IJ2-IJ5 and IJ13-IJ14 (Table 2B) were used in step b), the time between step b) and step c) was fixed at about 0.5 seconds and the inkjet ink deposit was fixed at about 1.0 g/m$^2$, the optical results of the obtained security features are reported in Table 5A;

the Examples according to the method of the invention E75-E83, wherein the UV-Vis hybrid curable screen printing ink SP9 (Table 1B) was used in step a), the inkjet inks IJ2-IJ5, IJ8-IJ10 and IJ13-IJ14 (Table 2B) were used in step b), the time between step b) and step c) was fixed at about 0.5 seconds and the inkjet ink deposit was fixed at about 1.0 g/m$^2$, the optical results of the obtained security features are reported in Table 5B;

the Examples according to a comparative method C9-C18 and examples according to the method of the invention E84-E87 and, wherein the UV-Vis cationically curable screen printing ink SP4 (Table 1B) was used in step a), the inkjet ink IJ11 (Table 2B) was used in step b), the inkjet ink deposits were either about 1.0 g/m$^2$ or about 11.5 g/m$^2$ and the time between step b) and step c) was varied between about 0.5 seconds and about 100 seconds, the optical results of the obtained security features are reported in Table 6A; and the Examples according to the method of the invention E88-E91 and examples according to a comparative method C19-C28, wherein the UV-Vis hybrid curable screen printing ink SP9 (Table 1B) was used in step a), the inkjet ink IJ11 (Table 2B) was used in step b), the inkjet ink deposits were either about 1.0 g/m$^2$ or about 11.5 g/m$^2$ and the time between step b) and step c) was varied between about 0.5 seconds and about 100 seconds. The optical results of the obtained security features are reported in Table 6B.

D-2. Assessment of the Optical Properties

The optical properties of the security features obtained according to a comparative method (C1-C28) or a method according to the invention (E1-E91) were independently assessed in reflection, in transmission and visually using the procedures described herebelow. The visual assessments (in both reflection and transmission) aimed at reproducing the way average people on the street would observe the security feature, while the assessments using specific devices closely mimic machine detection as routinely performed e.g. in ATMs or high-speed sorting machines.

The assessment in reflection was performed using a goniospectrometer (Goniospektrometer Codec WI-10 5&5 by Phyma GmbH Austria), according to the following procedure:

i) for each of the UV-Vis radiation cationically or hybrid curable screen printing inks (SP1-SP10), reference samples were obtained using the same method as described hereabove under step a) and c) (i.e. omitting the step b) of inkjet printing). In other words, each reference samples consisted of the substrate (x20) comprising a cured coating layer (x10) lacking the one or more inkjet printed indicia (x30));

ii) the L*a*b* values of the reference samples were determined at 0° to the normal with illumination at 22.5. The C* (chroma or color saturation) value was calculated from a* and b* values according to the CIELAB (1976) color space, wherein:

$$C^* = \sqrt{(a^*)^2 + (b^*)^2}$$

the provided C* values of the reference samples corresponding to the chroma of the first area made of the cured coating layer (x10) and were reported as C* (22.5°/0°) first area in the Tables, wherein a C* value of at least 20 for the first area corresponds to a metallic gold color in reflection.

iii) For each of the examples prepared according to comparative methods (C1-C28) and the Examples prepared according to the present invention (E1-E91), the C* value of the one or more indicia (x30) printed in step b) was determined. This corresponded to the chroma of the second area made of the combination of the coated layer (x10) and the one or more cured inkjet printed indicia (x30) (referred as C* (22.5°/0°) second area in the Tables);

iv) from the C* values of both first and second areas, a contrast value in % (referred as Contrast [%] in the Tables) was derived according to the following formula:

$$\text{Contrast } [\%] = \frac{C^*(\text{first area}) - C^*(\text{second area})}{C^*(\text{first area})} * 100$$

wherein a contrast of about 10% is known to be detectable by a dedicated device, and hence corresponds to the threshold value for security applications.

Transmission measurements were carried out using a Datacolor 650 spectrophotometer (parameters: integration sphere, diffuse illumination (pulse xenon D65) and 8° viewing, analyzer SP2000 with dual 256 diode array for wavelength range of 360-700 nm, transmission sampling aperture size of 22 mm). The C*-value was obtained in the same way as described hereabove for the reflection measurement. The C* values are displayed as C* in the Tables.

The visual assessment in reflection was carried out as follows:

the contrast was observed under diffuse illumination (such as the light coming through a window with no direct sunlight), the substrate (x20) carrying the security feature being held vertically against the diffuse light source and the angle of view being chosen such that the diffuse light is not blocked by the head of the observer (meaning at a vertical angle comprised between about 700 and about 20°). The observer reported the contrast observed between the first area (x10) and the second area (x10+x30). The following scale was used: excellent, good, sufficient, insufficient, wherein insufficient contrast refers to security features that cannot be easily assessed by the observer being unsuitable as security features. The visual assessment in reflection is reported in the Tables as visual contrast.

A visual assessment was also carried out observing each security feature with the naked eye in transmission. The following colors have been observed and reported as Visual color in the Tables herebelow:

dull blue: the blue coloration is barely visible to visible;

blue: the blue coloration is intense; and deep blue: the blue coloration is very intense.

E. Results

E1. Variation of Inkjet Ink Deposit (C1-C8 and E1-E48)
(Tables 3A-3H)

TABLE 3A

Results of security features made with a UV-Vis radiation cationically curable screen printing
ink and a top coating inkjet ink comprising a hybrid curable monomer (C1 and E1-E7)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| C1 | SP4 | IJ11 | 0.5 | 1 | 10 | 0.4 | gold | 29 | 25 | 13 | insufficient | 41 | deep blue |
| E1 | SP4 | IJ11 | 0.5 | 1 | 25 | 1.0 | gold | 29 | 21 | 27 | good | 39 | deep blue |
| E2 | SP4 | IJ11 | 0.5 | 1 | 50 | 1.9 | gold | 29 | 19 | 32 | excellent | 42 | deep blue |
| E3 | SP4 | IJ11 | 0.5 | 1 | 100 | 3.8 | gold | 29 | 15 | 48 | excellent | 42 | deep blue |
| E4 | SP4 | IJ11 | 0.5 | 2 | 100 | 7.7 | gold | 29 | 3 | 89 | excellent | 43 | deep blue |
| E5 | SP4 | IJ11 | 0.5 | 3 | 100 | 11.5 | gold | 29 | 3 | 89 | excellent | 44 | deep blue |
| E6 | SP4 | IJ11 | 0.5 | 5 | 100 | 19.2 | gold | 29 | 3 | 90 | excellent | 45 | deep blue |
| E7 | SP4 | IJ11 | 0.5 | 7 | 100 | 26.9 | gold | 29 | 4 | 88 | excellent | 35 | blue |

TABLE 3B

Results of security features made with a UV-Vis radiation cationically curable screen printing ink
and a top coating inkjet ink comprising a cationically curable monomer (C2 and E8-E14)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| C2 | SP4 | IJ1 | 0.5 | 1 | 10 | 0.4 | gold | 29 | 22 | 23 | insufficient | 41 | deep blue |
| E8 | SP4 | IJ1 | 0.5 | 1 | 25 | 1.0 | gold | 29 | 20 | 29 | sufficient | 39 | deep blue |
| E9 | SP4 | IJ1 | 0.5 | 1 | 50 | 1.9 | gold | 29 | 17 | 41 | good | 41 | deep blue |
| E10 | SP4 | IJ1 | 0.5 | 1 | 100 | 3.8 | gold | 29 | 8 | 71 | excellent | 45 | deep blue |
| E11 | SP4 | IJ1 | 0.5 | 2 | 100 | 7.7 | gold | 29 | 3 | 90 | excellent | 47 | deep blue |
| E12 | SP4 | IJ1 | 0.5 | 3 | 100 | 11.5 | gold | 29 | 3 | 88 | excellent | 47 | deep blue |
| E13 | SP4 | IJ1 | 0.5 | 5 | 100 | 19.2 | gold | 29 | 5 | 84 | excellent | 42 | deep blue |
| E14 | SP4 | IJ1 | 0.5 | 7 | 100 | 26.9 | gold | 29 | 6 | 78 | excellent | 41 | deep blue |

TABLE 3C

Results of security features made with a UV-Vis radiation cationically curable screen
printing ink and a top coating inkjet ink comprising a solvent (C3 and E15-E21)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| C3 | SP4 | IJ12 | 0.5 | 1 | 10 | 0.38 | gold | 29 | 25 | 13 | insufficient | 43 | deep blue |
| E15 | SP4 | IJ12 | 0.5 | 1 | 25 | 0.96 | gold | 29 | 19 | 32 | sufficient | 39 | deep blue |
| E16 | SP4 | IJ12 | 0.5 | 1 | 50 | 1.92 | gold | 29 | 18 | 38 | good | 38 | deep blue |
| E17 | SP4 | IJ12 | 0.5 | 1 | 100 | 3.85 | gold | 29 | 4 | 84 | excellent | 27 | blue |
| E18 | SP4 | IJ12 | 0.5 | 2 | 100 | 7.69 | gold | 29 | 5 | 83 | excellent | 27 | blue |
| E19 | SP4 | IJ12 | 0.5 | 3 | 100 | 11.5 | gold | 29 | 4 | 87 | excellent | 26 | blue |
| E20 | SP4 | IJ12 | 0.5 | 5 | 100 | 19.2 | gold | 29 | 6 | 79 | excellent | 31 | blue |
| E21 | SP4 | IJ12 | 0.5 | 7 | 100 | 26.9 | gold | 29 | 8 | 72 | excellent | 32 | blue |

TABLE 3D

Results of security features made with a UV-Vis radiation cationically curable screen printing ink and a top coating
inkjet ink comprising a mixture of a radically curable monomer and a free radical photoinitiator (C4 and E22-E28)

| | Screen | | Time | Inkjet ink deposit | | | | Reflection | | | | Transmission |
| | | | between | Inkjet | Image | | Visual | C* | C* | | | |
| | | | step b) | ink | grey | Ink | color | (22.5°/0°) | (22.5°/0°) | | | |
| | printing | Inkjet | and c) | deposit | level | deposit | (first | first | second | Contrast | Visual | Visual |
| | ink | ink | [s] | [dpd] | [%] | [g/m²] | area) | area | area | [%] | contrast | C* color |
|---|---|---|---|---|---|---|---|---|---|---|---|---|
| C4 | SP4 | IJ7 | 0.5 | 1 | 10 | 0.4 | gold | 29 | 24 | 15 | insufficient | 44 deep blue |
| E22 | SP4 | IJ7 | 0.5 | 1 | 25 | 1.0 | gold | 29 | 22 | 24 | sufficient | 41 deep blue |
| E23 | SP4 | IJ7 | 0.5 | 1 | 50 | 1.9 | gold | 29 | 20 | 31 | good | 39 deep blue |
| E24 | SP4 | IJ7 | 0.5 | 1 | 100 | 3.8 | gold | 29 | 14 | 51 | excellent | 41 deep blue |
| E25 | SP4 | IJ7 | 0.5 | 2 | 100 | 7.7 | gold | 29 | 4 | 85 | excellent | 40 deep blue |
| E26 | SP4 | IJ7 | 0.5 | 3 | 100 | 11.5 | gold | 29 | 5 | 84 | excellent | 38 deep blue |
| E27 | SP4 | IJ7 | 0.5 | 5 | 100 | 19.2 | gold | 29 | 4 | 87 | excellent | 37 deep blue |
| E28 | SP4 | IJ7 | 0.5 | 7 | 100 | 26.9 | gold | 29 | 3 | 88 | excellent | 40 deep blue |

TABLE 3E

Results of security features made with a UV-Vis radiation hybrid curable screen printing
ink and a top coating inkjet ink comprising a hybrid curable monomer (C5 and E29-E33)

| | Screen | | Time | Inkjet ink deposit | | | | Reflection | | | | Transmission |
| | | | between | Inkjet | Image | | Visual | C* | C* | | | |
| | | | step b) | ink | grey | Ink | color | (22.5°/0°) | (22.5°/0°) | | | |
| | printing | Inkjet | and c) | deposit | level | deposit | (first | first | second | Contrast | Visual | Visual |
| | ink | ink | [s] | [dpd] | [%] | [g/m²] | area) | area | area | [%] | contrast | C* color |
|---|---|---|---|---|---|---|---|---|---|---|---|---|
| C5 | SP9 | IJ11 | 0.5 | 1 | 10 | 0.4 | gold | 27 | 25 | 7 | insufficient | 39 deep blue |
| E29 | SP9 | IJ11 | 0.5 | 1 | 25 | 1.0 | gold | 27 | 23 | 16 | sufficient | 38 deep blue |
| E30 | SP9 | IJ11 | 0.5 | 1 | 50 | 1.9 | gold | 27 | 22 | 20 | good | 36 deep blue |
| E31 | SP9 | IJ11 | 0.5 | 1 | 100 | 3.8 | gold | 27 | 14 | 48 | excellent | 37 deep blue |
| E32 | SP9 | IJ11 | 0.5 | 2 | 100 | 7.7 | gold | 27 | 7 | 74 | excellent | 37 deep blue |
| E33 | SP9 | IJ11 | 0.5 | 3 | 100 | 11.5 | gold | 27 | 7 | 74 | excellent | 39 deep blue |

TABLE 3F

Results of security features made with a UV-Vis radiation hybrid curable screen printing ink
and a top coating inkjet ink comprising a cationically curable monomer (C6 and E34-E38)

| | Screen | | Time | Inkjet ink deposit | | | | Reflection | | | | Transmission |
| | | | between | Inkjet | Image | | Visual | C* | C* | | | |
| | | | step b) | ink | grey | Ink | color | (22.5°/0°) | (22.5°/0°) | | | |
| | printing | Inkjet | and c) | deposit | level | deposit | (first | first | second | Contrast | Visual | Visual |
| | ink | ink | [s] | [dpd] | [%] | [g/m²] | area) | area | area | [%] | contrast | C* color |
|---|---|---|---|---|---|---|---|---|---|---|---|---|
| C6 | SP9 | IJ1 | 0.5 | 1 | 10 | 0.4 | gold | 27 | 22 | 18 | insufficient | 37 deep blue |
| E34 | SP9 | IJ1 | 0.5 | 1 | 25 | 1.0 | gold | 27 | 19 | 30 | sufficient | 37 deep blue |
| E35 | SP9 | IJ1 | 0.5 | 1 | 50 | 1.9 | gold | 27 | 10 | 62 | good | 34 deep blue |
| E36 | SP9 | IJ1 | 0.5 | 1 | 100 | 3.8 | gold | 27 | 12 | 57 | excellent | 37 deep blue |
| E37 | SP9 | IJ1 | 0.5 | 2 | 100 | 7.7 | gold | 27 | 5 | 80 | excellent | 40 deep blue |
| E38 | SP9 | IJ1 | 0.5 | 3 | 100 | 11.5 | gold | 27 | 9 | 66 | excellent | 36 deep blue |

TABLE 3G

Results of security features made with a UV-Vis radiation hybrid curable screen
printing ink and a top coating inkjet ink comprising a solvent (C7 and E39-E43)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| C7 | SP9 | IJ12 | 0.5 | 1 | 10 | 0.38 | gold | 27 | 24 | 11 | insufficient | 37 | deep blue |
| E39 | SP9 | IJ12 | 0.5 | 1 | 25 | 0.96 | gold | 27 | 22 | 19 | sufficient | 35 | deep blue |
| E40 | SP9 | IJ12 | 0.5 | 1 | 50 | 1.92 | gold | 27 | 21 | 23 | good | 36 | deep blue |
| E41 | SP9 | IJ12 | 0.5 | 1 | 100 | 3.85 | gold | 27 | 20 | 27 | excellent | 35 | deep blue |
| E42 | SP9 | IJ12 | 0.5 | 2 | 100 | 7.69 | gold | 27 | 17 | 37 | excellent | 31 | blue |
| E43 | SP9 | IJ12 | 0.5 | 3 | 100 | 11.5 | gold | 27 | 10 | 62 | excellent | 25 | blue |

TABLE 3H

Results of security features made with a UV-Vis radiation hybrid curable screen printing
ink and a top coating inkjet ink comprising a radically curable monomer (C8 and E44-E48)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| C8 | SP9 | IJ6 | 0.5 | 1 | 10 | 0.4 | gold | 27 | 25 | 9 | insufficient | 40 | deep blue |
| E44 | SP9 | IJ6 | 0.5 | 1 | 25 | 1.0 | gold | 27 | 22 | 19 | sufficient | 40 | deep blue |
| E45 | SP9 | IJ6 | 0.5 | 1 | 50 | 1.9 | gold | 27 | 20 | 28 | good | 39 | deep blue |
| E46 | SP9 | IJ6 | 0.5 | 1 | 100 | 3.8 | gold | 27 | 13 | 51 | excellent | 38 | deep blue |
| E47 | SP9 | IJ6 | 0.5 | 2 | 100 | 7.7 | gold | 27 | 7 | 75 | excellent | 36 | deep blue |
| E48 | SP9 | IJ6 | 0.5 | 3 | 100 | 11.5 | gold | 27 | 10 | 64 | excellent | 34 | blue |

As shown in Tables 3A-H, the method according to the present invention allows the production of high quality security features in terms of contrast and color properties in reflection and transmission thus allowing an easy recognition and requires a minimum amount of inkjet ink deposit of about 0.8 g/m². As shown by the provided values and properties, said deposit allows to obtain a sufficient contrast between the first and the second areas (said contrast being either visually assessed and/or by using the goniospectrometer) for UV-Vis radiation cationically or hybrid curable screen printing inks (E1-E48). As shown in Tables 3A-H, an amount of at least about 1.0 g/m² (E1, E8, E15, E22, E29, E34, E39, E44) allowed the production of security features exhibiting sufficient to good contrast, and an amount of at least about 1.9 g/m² (E2, E9, E16, E23, E30, E35, E40, E45) allowed the production of security features exhibiting good to excellent contrast, both visually and using the goniospectrometer.

The security features obtained by the method according to the invention are gold in reflection and blue to deep blue in transmission, the one or more indicia (x30) appearing light brown to dark brown in reflection, depending on the amount of ink deposit. Transmission in the visible range is largely unaffected by the one or more indicia, making said one or more indicia easy to very easy to observe in reflection but almost invisible in transmission.

E2. Variation of the Composition of the UV-Vis Curable Screen Printing Inks (E49-E68

TABLE 4A

Results of security features made with UV-Vis radiation cationically curable screen printing inks
and a top coating inkjet ink comprising a hybrid curable monomer (E49-E58)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | color |
|---|---|---|---|---|---|---|---|---|---|---|---|---|---|
| E49 | SP1 | IJ11 | 0.5 | 1 | 25 | 1.0 | gold | 29 | 22 | 25 | sufficient | 44 | deep blue |
| E50 | SP2 | IJ11 | 0.5 | 1 | 25 | 1.0 | gold | 22 | 18 | 20 | sufficient | 40 | deep blue |
| E51 | SP3 | IJ11 | 0.5 | 1 | 25 | 1.0 | gold | 21 | 17 | 20 | sufficient | 40 | deep blue |
| E52 | SP4 | IJ11 | 0.5 | 1 | 25 | 1.0 | gold | 29 | 21 | 27 | good | 39 | deep blue |

TABLE 4A-continued

Results of security features made with UV-Vis radiation cationically curable screen printing inks
and a top coating inkjet ink comprising a hybrid curable monomer (E49-E58)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* color |
|---|---|---|---|---|---|---|---|---|---|---|---|---|
| E53 | SP5 | IJ11 | 0.5 | 1 | 25 | 1.0 | gold | 20 | 15 | 25 | sufficient | 38 deep blue |
| E54 | SP1 | IJ11 | 0.5 | 3 | 100 | 11.5 | gold | 29 | 4 | 88 | excellent | 50 deep blue |
| E55 | SP2 | IJ11 | 0.5 | 3 | 100 | 11.5 | gold | 22 | 6 | 72 | excellent | 47 deep blue |
| E56 | SP3 | IJ11 | 0.5 | 3 | 100 | 11.5 | gold | 21 | 5 | 76 | excellent | 37 deep blue |
| E57 | SP4 | IJ11 | 0.5 | 3 | 100 | 11.5 | gold | 29 | 3 | 89 | excellent | 44 deep blue |
| E58 | SP5 | IJ11 | 0.5 | 3 | 100 | 11.5 | gold | 20 | 3 | 84 | excellent | 39 deep blue |

TABLE 4B

Results of security features made with UV-Vis radiation hybrid curable screen printing
inks and a top coating inkjet ink comprising a hybrid curable monomer (E59-E68)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* color |
|---|---|---|---|---|---|---|---|---|---|---|---|---|
| E59 | SP6 | IJ11 | 0.5 | 1 | 25 | 1.0 | gold | 24 | 21 | 12 | sufficient | 40 deep blue |
| E60 | SP7 | IJ11 | 0.5 | 1 | 25 | 1.0 | gold | 20 | 15 | 25 | sufficient | 38 deep blue |
| E61 | SP8 | IJ11 | 0.5 | 1 | 25 | 1.0 | gold | 21 | 19 | 11 | sufficient | 38 deep blue |
| E62 | SP9 | IJ11 | 0.5 | 1 | 25 | 1.0 | gold | 27 | 23 | 16 | sufficient | 37 deep blue |
| E63 | SP10 | IJ11 | 0.5 | 1 | 25 | 1.0 | gold | 23 | 18 | 20 | sufficient | 35 deep blue |
| E64 | SP6 | IJ11 | 0.5 | 3 | 100 | 11.5 | gold | 24 | 5 | 79 | excellent | 40 deep blue |
| E65 | SP7 | IJ11 | 0.5 | 3 | 100 | 11.5 | gold | 20 | 7 | 66 | excellent | 33 blue |
| E66 | SP8 | IJ11 | 0.5 | 3 | 100 | 11.5 | gold | 21 | 8 | 61 | excellent | 36 deep blue |
| E67 | SP9 | IJ11 | 0.5 | 3 | 100 | 11.5 | gold | 27 | 7 | 74 | excellent | 38 deep blue |
| E68 | SP10 | IJ11 | 0.5 | 3 | 100 | 11.5 | gold | 23 | 3 | 88 | excellent | 36 deep blue |

40

As shown in Tables 4A-B, UV-Vis curable cationically screen printing inks (SP1-SP5) comprising either a cycloaliphatic epoxide or a mixture of a cycloaliphatic epoxide and one or more UV-Vis radiation curable compounds as well as UV-Vis curable hybrid screen printing inks (SP6-SP10) comprising either a cycloaliphatic epoxide or a mixture of a cycloaliphatic epoxide and one or more UV-Vis radiation curable compounds and radically curable compounds are suitable for producing high quality security features with the method according to the present invention. Said UV-Vis curable screen printing inks may comprise or may lack solvents. The security features obtained by the method according to the invention are gold in reflection and blue to deep blue in transmission whereas the indicia (x30) appear light brown to dark brown, depending on the amount of ink deposit. Transmission in the visible range is largely unaffected by the one or more indicia, making said one or more indicia easy to very easy to observe in reflection but almost invisible in transmission.

E3. Variation of the Composition of the Too Coating Inkjet Inks (E69-E83)

TABLE 5A

Results of security features made with a UV-Vis radiation cationically curable screen
printing ink and top coating inkjet inks of different compositions (E69-E74)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* color |
|---|---|---|---|---|---|---|---|---|---|---|---|---|
| E1[a) | SP4 | IJ11 | 0.5 | 1 | 25 | 1.0 | gold | 29 | 21 | 27 | good | 39 deep blue |
| E8[a) | SP4 | IJ1 | 0.5 | 1 | 25 | 1.0 | gold | 29 | 20 | 29 | sufficient | 39 deep blue |
| E15[a) | SP4 | IJ12 | 0.5 | 1 | 25 | 1.0 | gold | 29 | 19 | 32 | sufficient | 39 deep blue |
| E22[a) | SP4 | IJ7 | 0.5 | 1 | 25 | 1.0 | gold | 29 | 24 | 17 | sufficient | 41 deep blue |

TABLE 5A-continued

Results of security features made with a UV-Vis radiation cationically curable screen
printing ink and top coating inkjet inks of different compositions (E69-E74)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | Visual color |
|---|---|---|---|---|---|---|---|---|---|---|---|---|---|
| E69 | SP4 | IJ2 | 0.5 | 1 | 25 | 1.0 | gold | 29 | 22 | 24 | good | 43 | deep blue |
| E70 | SP4 | IJ3 | 0.5 | 1 | 25 | 1.0 | gold | 29 | 12 | 59 | excellent | 42 | deep blue |
| E71 | SP4 | IJ4 | 0.5 | 1 | 25 | 1.0 | gold | 29 | 25 | 11 | sufficient | 42 | deep blue |
| E72 | SP4 | IJ5 | 0.5 | 1 | 25 | 1.0 | gold | 29 | 25 | 12 | sufficient | 41 | deep blue |
| E73 | SP4 | IJ13 | 0.5 | 1 | 25 | 1.0 | gold | 29 | 17 | 40 | excellent | 46 | deep blue |
| E74 | SP4 | IJ14 | 0.5 | 1 | 25 | 1.0 | gold | 29 | 26 | 10 | sufficient | 49 | deep blue |

[a]Examples E1, E8, E15 and E22 from Tables 3A-3D have been added for comparison purposes

TABLE 5B

Results of security features made with a UV-Vis radiation hybrid curable screen
printing ink and top coating inkjet inks of different compositions (E75-E83)

| | Screen printing ink | Inkjet ink | Time between step b) and c) [s] | Inkjet ink deposit [dpd] | Image grey level [%] | Ink deposit [g/m²] | Visual color (first area) | C* (22.5°/0°) first area | C* (22.5°/0°) second area | Contrast [%] | Visual contrast | Transmission Visual C* | Visual color |
|---|---|---|---|---|---|---|---|---|---|---|---|---|---|
| E29[a] | SP9 | IJ11 | 0.5 | 1 | 25 | 1.0 | gold | 27 | 23 | 16 | sufficient | 38 | deep blue |
| E34[a] | SP9 | IJ1 | 0.5 | 1 | 25 | 1.0 | gold | 27 | 19 | 30 | sufficient | 37 | deep blue |
| E39[a] | SP9 | IJ12 | 0.5 | 1 | 25 | 1.0 | gold | 27 | 22 | 19 | sufficient | 35 | deep blue |
| E44[a] | SP9 | IJ6 | 0.5 | 1 | 25 | 1.0 | gold | 27 | 22 | 19 | sufficient | 40 | deep blue |
| E75 | SP9 | IJ2 | 0.5 | 1 | 25 | 1.0 | gold | 27 | 20 | 25 | good | 37 | deep blue |
| E76 | SP9 | IJ3 | 0.5 | 1 | 25 | 1.0 | gold | 27 | 20 | 25 | excellent | 39 | deep blue |
| E77 | SP9 | IJ4 | 0.5 | 1 | 25 | 1.0 | gold | 27 | 19 | 31 | good | 37 | deep blue |
| E78 | SP9 | IJ5 | 0.5 | 1 | 25 | 1.0 | gold | 27 | 15 | 44 | good | 39 | deep blue |
| E79 | SP9 | IJ8 | 0.5 | 1 | 25 | 1.0 | gold | 27 | 19 | 28 | sufficient | 36 | deep blue |
| E80 | SP9 | IJ9 | 0.5 | 1 | 25 | 1.0 | gold | 27 | 20 | 26 | sufficient | 33 | deep blue |
| E81 | SP9 | IJ10 | 0.5 | 1 | 25 | 1.0 | gold | 27 | 24 | 13 | sufficient | 40 | deep blue |
| E82 | SP9 | IJ13 | 0.5 | 1 | 25 | 1.0 | gold | 27 | 20 | 26 | good | 38 | deep blue |
| E83 | SP9 | IJ14 | 0.5 | 1 | 25 | 1.0 | gold | 27 | 21 | 21 | good | 40 | deep blue |

[a]Examples E29, E34, E39 and E44 from Tables 3E-3H have been added for comparison purposes As shown in Tables 5A, UV-Vis curable cationically screen printing inks used in combination with top coating inkjet inks comprising one or more cationically curable monomers (IJ1-5); or one or more radically curable monomers and one free radical photoinitiators (IJ17); or one or more hybrid monomer (IJ11); or one or more solvents (IJ12-IJ14) are suitable for producing high quality security features with the method according to the present invention. As shown in Tables 5B, UV-Vis curable hybrid screen printing inks used in combination with top coating inkjet inks comprising one or more cationically curable monomers (IJ1-5); or with one or more radically curable monomers (IJ6-IJ10); or one or more hybrid monomer (IJ11); or one or more solvents (IJ12-IJ14) are suitable for producing high quality security features with the method according to the present invention.

The security features obtained by the method according to the invention are gold in reflection and blue to deep blue in transmission whereas the indicia (x30) appear light brown to dark brown, depending on the amount of ink deposit. Transmission in the visible range is largely unaffected by the one or more indicia, making said one or more indicia easy to very easy to observe in reflection but almost invisible in transmission.

E4. Variation of the Time Between Step b) and Step c) (C9-C28 and E84-E89)

As shown in Table 6A-6B, the time between the step b) of applying the top coating inkjet inks at least partially on top of the coating layer (x10) and the step c) of curing the coating layers (x10) made of the UV-Vis curable screen printing inks and the indicia (x30) has been varied between about 0.5 seconds and about 100 seconds.

In addition to the measured or visually assessed optical properties as described at item D-2, a visual evaluation of the obtained resolution has been performed for the examples according to a comparative method (C9-C28) and Examples according to the method of the invention (E84-E89), wherein said examples have been prepared as described hereabove with the exception that the one or more indicia (x30) are in the shape of the name of "SICPA" of decreasing font sizes instead of squares. As shown in FIG. 1A, security features having one or more indicia (130), in particular an indicium, in the shape of the name "SICPA" (arial font) of different size have been prepared. This indicium had a total size of 30 mm×20 mm, a first line of "SICPA" was printed with an Arial size of 8 (name height: 2.1 mm), a second line was printed with a size of 6 (name height: 1.7 mm), a third line was printed with a size of 5 (name height: 1.3 mm), a fourth line was printed with a size of 4 (name height: 1.1 mm) and a fifth line was printed with a size of 3 (name height: 0.8 mm). The visual assessment of the resolution was made as follows:

excellent: the line printed with the smallest letters (Arial 3) is easily legible, the resolution is close to the resolution obtained with a conventional laser printer (resolution: 600 dpi) with the same font and the same font size (FIG. 1B)

good: a slight enlargement of the letters is observable and the line printed with the smallest letters (Arial 3) is still legible sufficient: enlargement of the letters is clearly observable; the line printed with the smallest letters (Arial 3) is barely legible while the line printed with slightly bigger letters (Arial 4) is easily legible insufficient: the letters are so enlarged as to appear diffused; the line printed with the smallest letters (Arial 3) is illegible while the line printed with slightly bigger letters (Arial 4) is barely legible.

Good to excellent resolution is known to be required for the preparation of security features comprising one or more complex indicia (such as a portrait, a photograph in levels of grey or a geometric figure comprising patterns of intricate lines) as well as codes of small size (including for example 1-D codes or QR codes), sufficient resolution is enough to print simpler one or more indicia (such as a geometric pattern made of flat area, numbers, letters or a logo) as well as codes of larger size. The resolution assessed according to the method described hereabove observed for security features obtained by the method of the invention (Examples E84-E91) and comparative methods (C9-C28) are provided in Tables 6A-6B.

TABLE 6A

Results of security features made with a UV-Vis radiation cationically curable screen printing ink and a top coating inkjet composition comprising a hybrid curable monomer and varying the time between step b) and step c) (C9-C18 and E84-E87)

| | | Time | Inkjet ink deposit | | | | Reflection | | | | Transmission | | |
| | | between step b) and c) [s] | Inkjet ink deposit [dpd] | Image grey level [%] | Ink deposit [g/m²] | Visual color (first area) | C* (22.5°/0°) first area | C* (22.5°/0°) second area | Con-trast [%] | Visual contrast | C* (trans-mission 8°) | Visual color | Resolution |
| Screen printing ink | Ink-jet ink | | | | | | | | | | | | |
|---|---|---|---|---|---|---|---|---|---|---|---|---|---|
| E84 | SP4 | IJ11 | 0.5 | 1 | 25 | 1.0 | gold | 29 | 21 | 27 | good | 39 | deep blue | excellent |
| E85 | SP4 | IJ11 | 3.5 | 1 | 25 | 1.0 | gold | 29 | 26 | 10 | sufficient | 40 | deep blue | excellent |
| C9 | SP4 | IJ11 | 5 | 1 | 25 | 1.0 | gold | 29 | 27 | 4 | insufficient | 41 | deep blue | — |
| C10 | SP4 | IJ11 | 10 | 1 | 25 | 1.0 | gold | 29 | 27 | 5 | insufficient | 43 | deep blue | — |
| C11 | SP4 | IJ11 | 30 | 1 | 25 | 1.0 | gold | 29 | 29 | 0 | insufficient | 44 | deep blue | — |
| C12 | SP4 | IJ11 | 60 | 1 | 25 | 1.0 | gold | 29 | 29 | 0 | insufficient | 43 | deep blue | — |
| C13 | SP4 | IJ11 | 100 | 1 | 25 | 1.0 | gold | 29 | 29 | 0 | insufficient | 43 | deep blue | — |
| E86 | SP4 | IJ11 | 0.5 | 3 | 100 | 11.5 | gold | 29 | 3 | 89 | excellent | 44 | deep blue | excellent |
| E87 | SP4 | IJ11 | 3.5 | 3 | 100 | 11.5 | gold | 29 | 3 | 89 | excellent | 45 | deep blue | good |
| C14 | SP4 | IJ11 | 5 | 3 | 100 | 11.5 | gold | 29 | 3 | 89 | excellent | 44 | deep blue | insufficient |
| C15 | SP4 | IJ11 | 10 | 3 | 100 | 11.5 | gold | 29 | 3 | 89 | excellent | 46 | deep blue | insufficient |
| C16 | SP4 | IJ11 | 30 | 3 | 100 | 11.5 | gold | 29 | 2 | 93 | excellent | 46 | deep blue | insufficient |
| C17 | SP4 | IJ11 | 60 | 3 | 100 | 11.5 | gold | 29 | 2 | 93 | excellent | 45 | deep blue | insufficient |
| C18 | SP4 | IJ11 | 100 | 3 | 100 | 11.5 | gold | 29 | 3 | 89 | excellent | 47 | deep blue | insufficient |

TABLE 6B

Results of security features made with a UV-Vis radiation hybrid curable screen printing ink and a top coating inkjet composition comprising a hybrid curable monomer and varying the time between step b) and step c) (C19-C28 and E88-E91)

| | | Time | Inkjet ink deposit | | | | Reflection | | | | Transmission | | |
| | | between step b) and c) [s] | Inkjet ink deposit [dpd] | Image grey level [%] | Ink deposit [g/m²] | Color (first area) | C* (22.5°/0°) first area | C* (22.5°/0°) second area | Con-trast [%] | Visual contrast | C* (trans-mission 8°) | Color (trans-mission) | Resolution |
| Screen printing ink | Ink-jet ink | | | | | | | | | | | | |
|---|---|---|---|---|---|---|---|---|---|---|---|---|---|
| E88 | SP9 | IJ1 | 0.5 | 1 | 25 | 1.0 | gold | 27 | 23 | 19 | sufficient | 3 | deep blue | excellent |
| E89 | SP9 | IJ1 | 3.5 | 1 | 25 | 1.0 | gold | 27 | 23 | 19 | sufficient | 3 | deep blue | excellent |
| C19 | SP9 | IJ1 | 5 | 1 | 25 | 1.0 | gold | 27 | 26 | 9 | insufficient | 4 | deep blue | — |
| C20 | SP9 | IJ1 | 10 | 1 | 25 | 1.0 | gold | 27 | 26 | 9 | insufficient | 3 | deep blue | — |
| C21 | SP9 | IJ1 | 30 | 1 | 25 | 1.0 | gold | 27 | 28 | 5 | insufficient | 3 | deep blue | — |
| C22 | SP9 | IJ1 | 60 | 1 | 25 | 1.0 | gold | 27 | 27 | 2 | insufficient | 3 | deep blue | — |
| C23 | SP9 | IJ1 | 100 | 1 | 25 | 1.0 | gold | 27 | 30 | 0 | insufficient | 3 | deep blue | — |
| E90 | SP9 | IJ1 | 0.5 | 3 | 100 | 11.5 | gold | 27 | 7 | 75 | excellent | 3 | deep blue | excellent |
| E91 | SP9 | IJ1 | 3.5 | 3 | 100 | 11.5 | gold | 27 | 3 | 89 | excellent | 4 | deep blue | good |
| C24 | SP9 | IJ1 | 5 | 3 | 100 | 11.5 | gold | 27 | 4 | 86 | excellent | 4 | deep blue | insufficient |
| C25 | SP9 | IJ1 | 10 | 3 | 100 | 11.5 | gold | 27 | 3 | 89 | excellent | 4 | deep blue | insufficient |
| C26 | SP9 | IJ1 | 30 | 3 | 100 | 11.5 | gold | 27 | 6 | 79 | excellent | 4 | deep blue | insufficient |

TABLE 6B-continued

Results of security features made with a UV-Vis radiation hybrid curable screen printing ink and a top coating inkjet
composition comprising a hybrid curable monomer and varying the time between step b) and step c) (C19-C28 and E88-E91)

| | | | Time | Inkjet ink deposit | | | | Reflection | | | | Transmission | | |
| | Screen printing ink | Ink-jet ink | between step b) and c) [s] | Inkjet ink deposit [dpd] | Image grey level [%] | Ink deposit [g/m²] | Color (first area) | C* (22.5°/0°) first area | C* (22.5°/0°) second area | Con-trast [%] | Visual contrast | C* (trans-mission 8°) | Color (trans-mission) | Resolution |
| --- | --- | --- | --- | --- | --- | --- | --- | --- | --- | --- | --- | --- | --- | --- |
| C27 | SP9 | IJ1 | 60 | 3 | 100 | 11.5 | gold | 27 | 4 | 86 | excellent | 4 | deep blue | insufficient |
| C28 | SP9 | IJ1 | 100 | 3 | 100 | 11.5 | gold | 27 | 4 | 86 | excellent | 4 | deep blue | insufficient |

As shown in Tables 6A-B, the method according to the present invention allows the production of high quality security features in terms of contrast and color properties in reflection and transmission thus allowing an easy recognition and requires a time between step b) and step c) shorter than 5 seconds, in particular less than 4 seconds or equal to about 3.5 seconds, to get a sufficient resolution with an inkjet ink deposit of about 11.5 g/m².

A further example has been prepared and is shown in FIG. 2, wherein said security feature has been prepared by applying the UV-Vis radiation hybrid curable screen printing ink SP3 by hand on a piece of a transparent window of a polymer substrate (220) (Guardian, thickness 75 µm, supplied by CCL Secure, having a dimension of 60 mm×60 mm) using a 160 threads/cm screen so as at obtain coating layers (210) having a thickness of 7-10 µm and forming a square with the following dimensions: 50 mm×50 mm, by applying on top of the screen printed layer (210) the top coating inkjet ink IJ11 by a DOD (drop-on-demand) inkjet printing process using the KM1024i inkjet head (Konica Minolta, 360 dpi)) on the coating layers (210) with an inkjet ink deposit of 1 dpd (3.8 g/m²) so as to obtain one or more indicia (230), in particular an indicium, having the shape of a QR code (size: 24 mm×24 mm). Subsequently to said inkjet printing step, the screen printed layer (210) and the inkjet printed indicium (230) were cured by exposure to a UV-LED lamp from OmniCure® (Type AC4 50×25 mm, 385 nm, 8 W/cm²) for about 0.075 second, while the time between the inkjet printing step and the curing step was fixed at 0.5 seconds.

The invention claimed is:

1. A method for producing a security feature exhibiting one or more indicia on a substrate comprising:

a step a) of applying on a substrate surface a UV-Vis radiation curable ink, said UV-Vis radiation curable ink being in a first, liquid state so as to form a coating layer and said UV-Vis radiation curable ink comprising:

i) from about 7.5 wt-% to about 20 wt-% of silver nanoplatelets bearing a surface stabilizing agent of general formula (V)

$$
\underset{R^B}{\overset{R^A}{\diagdown}} N \diagdown \underset{S}{\overset{S^-}{\diagup}} \quad Cat^+,
$$
(V)

wherein the residue $R^A$ is a $C_2$-$C_4$-alkyl group substituted with a hydroxy group;
the residue $R_B$ is selected from a $C_1$-$C_4$-alkyl group, and a $C_2$-$C_4$-alkyl group substituted with a hydroxy group; and $Cat^+$ is an ammonium cation of general formula $^+NH_2R^CR^D$, wherein the residue $R^C$ is a $C_2$-$C_4$-alkyl group substituted with a hydroxy group; and
the residue $R^D$ is selected from a $C_2$-$C_4$-alkyl group, and a $C_2$-$C_4$-alkyl group substituted with a hydroxy group;

ii) from about 45 wt-% to about 80 wt-% of either a cycloaliphatic epoxide, or a mixture of a cycloaliphatic epoxide and one or more UV-Vis radiation curable compounds;

iii) one or more cationic photoinitiators;

iv) a perfluoropolyether surfactant functionalized with one or more functional groups selected from the group consisting of hydroxyl, acrylate, methacrylate, and trialkoxysilyl;

v) from about 3 wt-% to about 12 wt-% of a polyvinyl chloride copolymer containing at least 60 wt-% of vinyl chloride; and optionally vi) up to about 25 wt-% of one or more organic solvents;

the weight percents being based on the total weight of the UV-Vis radiation curable ink, subsequently to the step a), a step b) of applying by a contactless fluid microdispensing technology a top coating composition at least partially on top of the coating layer, wherein said top coating composition is applied in the form of one or more indicia, wherein said one or more indicia have an ink deposit greater than about 0.8 g/m²;

subsequently to step b), a step c) of curing the coating layer and the one or more indicia with one or more curing units, wherein the time between steps b) and c) is less than 5 seconds.

2. The method according to claim 1, wherein the one or more UV-Vis radiation curable compounds comprise one or more cationically curable monomers selected from the group consisting of vinyl ethers, propenyl ethers, cyclic ethers other than a cycloaliphatic epoxide, lactones, cyclic thioethers, vinyl thioethers, propenyl thioethers, hydroxyl-containing compounds, and mixtures thereof.

3. The method according to claim 2, wherein the one or more UV-Vis radiation curable compounds comprise one or more cationically curable monomers selected from the group consisting of vinyl ethers, cyclic ethers other than a cycloaliphatic epoxide and mixtures thereof.

4. The method according to claim 1, wherein the one or more UV-Vis radiation curable compounds comprise one or more radically curable monomers and/or oligomers, and the UV-Vis radiation curable ink further comprises vii) one or more free radical photoinitiators.

5. The method according to claim 1, wherein the UV-Vis radiation curable ink comprises an amount of perfluoropolyether surfactant from about 0.025 wt-% to about 5 wt-%, wherein the weight percents are based on the total weight of the UV-Vis radiation curable ink.

6. The method according to claim 1, wherein the top coating composition comprises one or more cationically curable compounds, one or more hybrid curable compounds, one or more solvents, one or more radically curable compounds or a mixture thereof.

7. The method according to claim 6, wherein the cationically curable compounds are selected from the group consisting vinyl ethers, glycidyl ethers, oxetanes and mixtures thereof; and/or the one or more hybrid curable compounds are hydroxy modified or (meth)acrylate modified vinyl ethers; and/or the one or more solvents are selected from the group consisting of alcohols ketones, glycols, glycol ethers, ether esters, glycol ether esters, alkylene carbonates and mixtures thereof, and/or the one or more radically curable compounds are selected from the group consisting of mono (meth)acrylates, di(meth)acrylates, tri(meth)acrylates and mixtures thereof.

8. The method according to claim 1, wherein the silver nanoplatelets have a number mean diameter in the range of 50 to 150 nm with a standard deviation of less than 60%, a number mean thickness in the range of 5 to 30 nm with a standard deviation of less than 50%, and a mean aspect ratio higher than 2.0, the number mean diameter being determined by transmission electron microscopy and the mean thickness being determined by transmission electron microscopy.

9. The method according to claim 8, wherein the number mean diameter of the silver nanoplatelets is in the range of 70 to 120 nm with the standard deviation being less than 50%, the number mean thickness of the silver nanoplatelets is in the range of 8 to 25 nm with the standard deviation being less than 30%, and the mean aspect ratio of the silver nanoplatelets is higher than 2.5.

10. The method according to claim 1, wherein the surface stabilizing agent of general formula (V) is present in an amount from about 0.5% to about 5% of the weight percent (wt-%) of the silver nanoplatelets of i).

11. The method according to claim 1, wherein the step c) of curing the coating layer and the one or more indicia is carried out with one or more curing units selected from the group consisting of mercury lamps, UV-LED lamps and sequences thereof.

12. The method according to claim 11, wherein the step c) is carried out with one or more UV-LED lamps.

13. The method according to claim 1, wherein the one or more indicia are selected from the group consisting of codes, symbols, alphanumeric symbols, motifs, geometric patterns, letters, words, numbers, logos, drawings, portraits and combinations thereof.

14. The method according to claim 1, wherein the step a) is carried out by a process selected from the group consisting of rotogravure processes, flexography processes and screen printing processes and/or the step b) is carried out by an inkjet printing process.

15. The method according to claim 14, wherein the step a) is carried out by a process selected from the group consisting of screen printing processes and/or the step b) is carried out by a drop-on-demand inkjet printing process.

16. The method according to claim 1, wherein the UV-Vis radiation curable ink is applied on a transparent or partially transparent region of the substrate.

17. The method according to claim 1, wherein said one or more indicia have an ink deposit greater than or equal to 1.0 $g/m^2$.

18. The method according to claim 1, wherein the time between steps b) and c) is less than about 4 seconds.

19. The method according to claim 1, wherein the time between steps b) and c) is equal to about 3.5 seconds or less than about 3.5 seconds.

20. A security feature produced by the method recited in claim 1.

* * * * *